United States Patent

Ohwa et al.

(10) Patent No.: US 8,885,071 B2
(45) Date of Patent: Nov. 11, 2014

(54) IMAGE PICKUP APPARATUS AND CONTROL METHOD FOR FLASH DISTRIBUTION

(75) Inventors: Yasushi Ohwa, Machida (JP); Yoshihiro Homma, Asaka (JP)

(73) Assignee: Canon Kabushiki Kaisha, Tokyo (JP)

( * ) Notice: Subject to any disclaimer, the term of this patent is extended or adjusted under 35 U.S.C. 154(b) by 501 days.

(21) Appl. No.: 12/863,785

(22) PCT Filed: Mar. 13, 2009

(86) PCT No.: PCT/JP2009/055550
§ 371 (c)(1),
(2), (4) Date: Jul. 21, 2010

(87) PCT Pub. No.: WO2009/116652
PCT Pub. Date: Sep. 24, 2009

(65) Prior Publication Data
US 2010/0289929 A1    Nov. 18, 2010

(30) Foreign Application Priority Data

Mar. 21, 2008   (JP) ................................. 2008-074460

(51) Int. Cl.
| | |
|---|---|
| H04N 5/217 | (2011.01) |
| H04N 9/73 | (2006.01) |
| H04N 5/222 | (2006.01) |
| H04N 5/225 | (2006.01) |
| G03B 15/05 | (2006.01) |
| H04N 5/235 | (2006.01) |
| H04N 5/243 | (2006.01) |

(52) U.S. Cl.
CPC .............. *G03B 15/05* (2013.01); *H04N 5/2256* (2013.01); *H04N 5/2354* (2013.01); *H04N 5/2351* (2013.01); *H04N 5/243* (2013.01)
USPC .......... 348/241; 348/224.1; 348/370; 348/371

(58) Field of Classification Search
None
See application file for complete search history.

(56) References Cited

U.S. PATENT DOCUMENTS 4,954,897 A   9/1990   Ejima et al.
5,420,635 A   5/1995   Konishi et al.
(Continued)

FOREIGN PATENT DOCUMENTS

CN   1856028 A   11/2006
CN   1917587 A   2/2007
(Continued)

OTHER PUBLICATIONS

Supplementary European Search Report and Written Opinion, dated Mar. 2, 2011, for counterpart European patent application No. 09721239.3-2209/2269370.

(Continued)

*Primary Examiner* — Lin Ye
*Assistant Examiner* — John H Morehead, III
(74) *Attorney, Agent, or Firm* — Fitzpatrick, Cella, Harper & Scinto

(57) ABSTRACT

An image pickup apparatus arranged so that an optical image of an object obtained by emitting a flash is converted into an electric signal to obtain a first image regarding photographing of the object, the same optical image of the object is converted into an electric signal to obtain a second image, a distance from the object is measured for each image area of the first image on the basis of the second image, and the first image is corrected on the basis of the distance from the object measured for each image area and light distribution characteristic data of a flash stored beforehand corresponding to the distance of the object.

16 Claims, 29 Drawing Sheets

(56) References Cited

U.S. PATENT DOCUMENTS

| | | | |
|---|---|---|---|
| 5,880,781 A | | 3/1999 | Udagawa et al. |
| 6,674,466 B1* | | 1/2004 | Takaoka ............... 348/224.1 |
| 6,829,008 B1* | | 12/2004 | Kondo et al. ............ 348/302 |
| 7,301,563 B1 | | 11/2007 | Kakinuma et al. |
| 7,826,092 B2* | | 11/2010 | Ejima et al. ............. 358/2.1 |
| 2003/0137597 A1* | | 7/2003 | Sakamoto et al. ........ 348/371 |
| 2005/0206966 A1 | | 9/2005 | Kakumitsu |
| 2006/0092293 A1* | | 5/2006 | Ichikawa et al. ...... 348/231.99 |
| 2006/0193622 A1* | | 8/2006 | Endo ...................... 396/157 |
| 2006/0198625 A1 | | 9/2006 | Okuno et al. |
| 2007/0230933 A1* | | 10/2007 | Sugimoto et al. ......... 396/61 |
| 2007/0274698 A1* | | 11/2007 | Nose ........................ 396/65 |
| 2008/0074536 A1* | | 3/2008 | Tamura ................... 348/371 |
| 2008/0079819 A1* | | 4/2008 | Uchida ................... 348/229.1 |
| 2008/0252749 A1* | | 10/2008 | Fujiwara ................ 348/224.1 |
| 2010/0271510 A1* | | 10/2010 | Suda ................... 348/231.99 |
| 2011/0019991 A1* | | 1/2011 | Lee et al. ................ 396/164 |
| 2012/0188425 A1* | | 7/2012 | Kita ....................... 348/294 |

FOREIGN PATENT DOCUMENTS

| | | |
|---|---|---|
| EP | 1515545 A1 | 3/2005 |
| JP | 9-43507 A | 2/1997 |
| JP | 9-46715 A | 2/1997 |
| JP | 11-069277 A | 3/1999 |
| JP | 11-331575 A | 11/1999 |
| JP | 2000-050151 A | 2/2000 |
| JP | 2000-156823 A | 6/2000 |
| JP | 2003-283922 A | 10/2003 |
| JP | 2004-336245 A | 11/2004 |
| JP | 2005-354167 A | 12/2005 |
| WO | 2005/122549 A1 | 12/2005 |

OTHER PUBLICATIONS

Office Action, dated Oct. 31, 2011, in Korean Patent Application No. 10-2010-7022938.

International Preliminary Report on Patentability and Written Opinion of the International Searching Authority, dated Sep. 21, 2010, for international patent application No. PCT/JP2009/055550.

Office Action, dated Apr. 11, 2012, in counterpart Chinese Patent Application No. 200980110241.9.

Jun. 2, 2009 International Search Report and Written Opinion in PCT/JP2009/055550.

Office Action, dated Sep. 13, 2012, in Chinese Patent Application No. 200980110241.9.

* cited by examiner

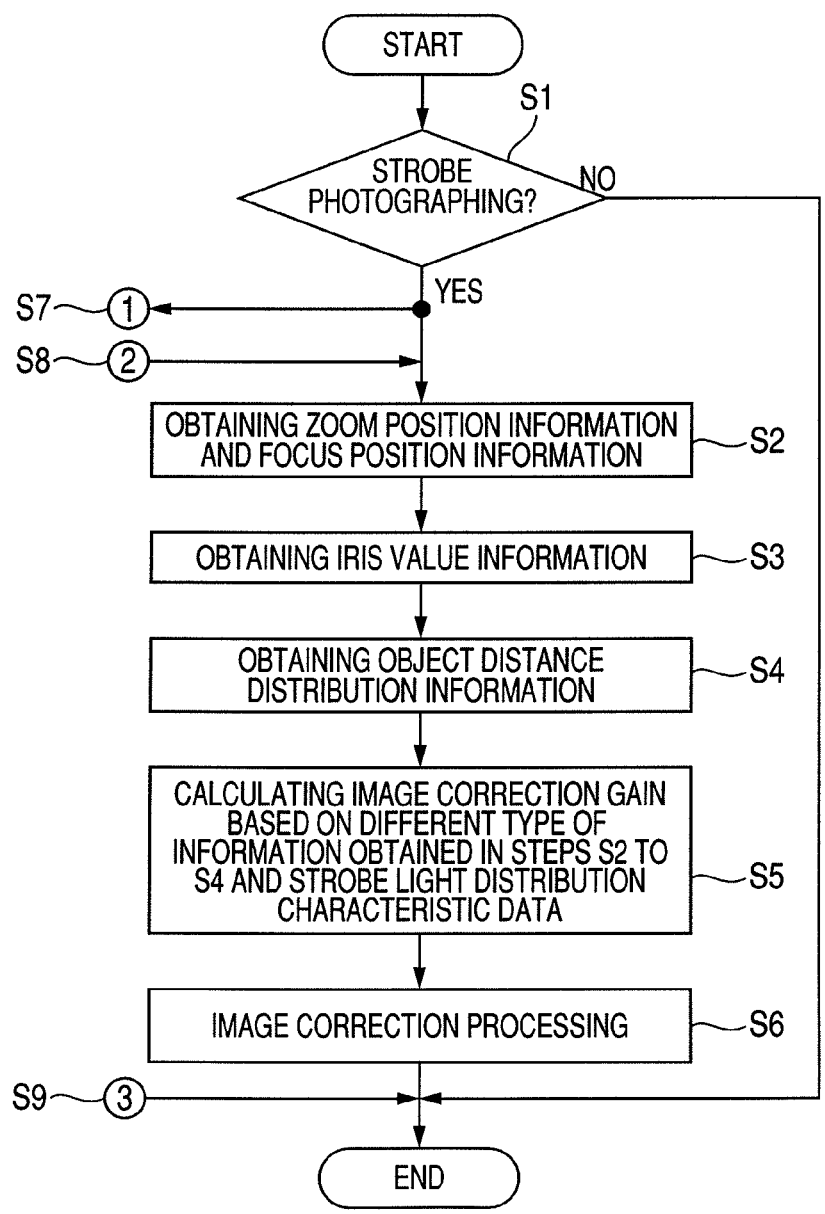

FIG. 3A

| | |
|---|---|
| G | R |
| B | G |

FIG. 3B

| | |
|---|---|
| Ye | Mg |
| Cy | Ye |

FIG. 3C

| | |
|---|---|
| G | Mg |
| Cy | Ye |

FIG. 4A

| G | R |
|---|---|
| B | S |

FIG. 4B

| Ye | Mg |
|----|----|
| Cy | S  |

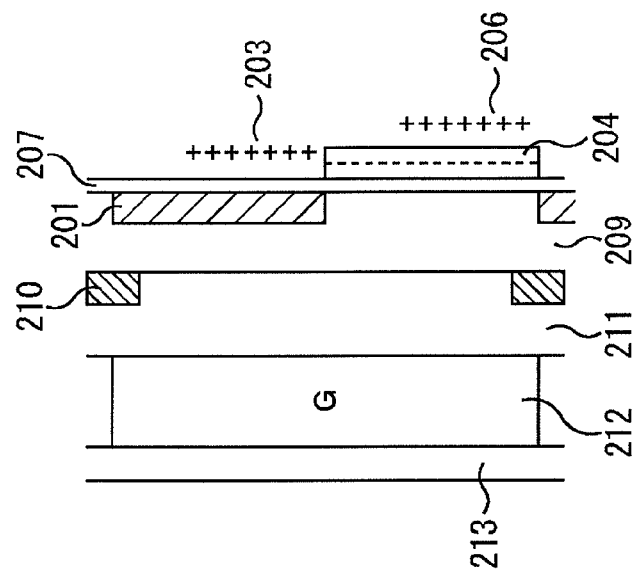
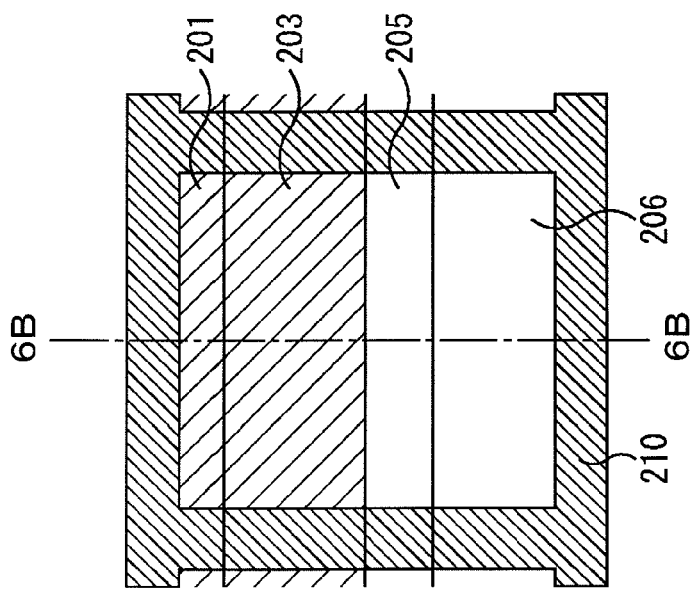

FIG. 7

| G | R | G | R | G | R | G | R |
|---|---|---|---|---|---|---|---|
| B | G | B | G | B | G | B | G |
| G | R | G | R | G | R | G | R |
| B | S1 | B | S1 | B | S1 | B | S1 |
| G | R | G | R | G | R | G | R |
| B | S2 | B | S2 | B | S2 | B | S2 |
| G | R | G | R | G | R | G | R |
| B | G | B | G | B | G | B | G |

} ROW GROUP OF CONVENTIONAL COLOR PIXEL ARRANGEMENT

} ROW GROUP INCLUDING FIRST DISTANCE MEASUREMENT PIXELS (PHASE SENSOR)

} ROW GROUP INCLUDING SECOND DISTANCE MEASUREMENT PIXELS (PHASE SENSOR)

} ROW GROUP OF CONVENTIONAL COLOR PIXEL ARRANGEMENT

FIG. 11

| G | R | G | R | G | R | G | R |
|---|---|---|---|---|---|---|---|
| B | G | B | G | B | G | B | G |
| G | R | G | R | G | R | G | R |
| B | S1 | B | S2 | B | S1 | B | S2 |
| G | R | G | R | G | R | G | R |
| B | G | B | G | B | G | B | G |
| G | R | G | R | G | R | G | R |
| B | G | B | G | B | G | B | G |

- Rows 1–2: ROW GROUP OF CONVENTIONAL COLOR PIXEL ARRANGEMENT
- Rows 3–4: ROW GROUP INCLUDING FIRST AND SECOND DISTANCE MEASUREMENT PIXELS (PHASE SENSOR)
- Rows 5–8: ROW GROUP OF CONVENTIONAL COLOR PIXEL ARRANGEMENT

FIG. 12

| G | R | G | R | G | R | G | R |
|---|---|---|---|---|---|---|---|
| B | G | B | G | B | G | B | G |
| G | R | G | R | G | R | G | R |
| B | S1 | B | S1 | B | S1 | B | S1 |
| G | R | G | R | G | R | G | R |
| B | S2 | B | S2 | B | S2 | B | S2 |
| G | R | G | R | G | R | G | R |
| B | S1 | B | S1 | B | S1 | B | S1 |
| G | R | G | R | G | R | G | R |
| B | G | B | G | B | G | B | G |

- Rows 1–2: ROW GROUP OF CONVENTIONAL COLOR PIXEL ARRANGEMENT
- Rows 3–4: FIRST ROW GROUP INCLUDING FIRST DISTANCE MEASUREMENT PIXELS (PHASE SENSOR)
- Rows 5–6: ROW GROUP INCLUDING SECOND DISTANCE MEASUREMENT PIXELS (PHASE SENSOR)
- Rows 7–8: SECOND ROW GROUP INCLUDING FIRST DISTANCE MEASUREMENT PIXELS (PHASE SENSOR)
- Rows 9–10: ROW GROUP OF CONVENTIONAL COLOR PIXEL ARRANGEMENT

| G | R | G | R | G | R | G | R |
|---|---|---|---|---|---|---|---|
| B | G | B | G | B | G | B | G |
| G | R | G | R | G | R | G | R |
| B | S1 | B | S2 | B | S1 | B | S2 |
| G | R | G | R | G | R | G | R |
| B | S2 | B | S1 | B | S2 | B | S1 |
| G | R | G | R | G | R | G | R |
| B | G | B | G | B | G | B | G |

- ROW GROUP OF CONVENTIONAL COLOR PIXEL ARRANGEMENT
- FIRST ROW GROUP INCLUDING FIRST AND SECOND DISTANCE MEASUREMENT PIXELS (PHASE SENSOR)
- SECOND ROW GROUP INCLUDING FIRST AND SECOND DISTANCE MEASUREMENT PIXELS (PHASE SENSOR)
- ROW GROUP OF CONVENTIONAL COLOR PIXEL ARRANGEMENT

PUPIL DIVISION IN HORIZONTAL DIRECTION

PUPIL DIVISION IN VERTICAL DIRECTION

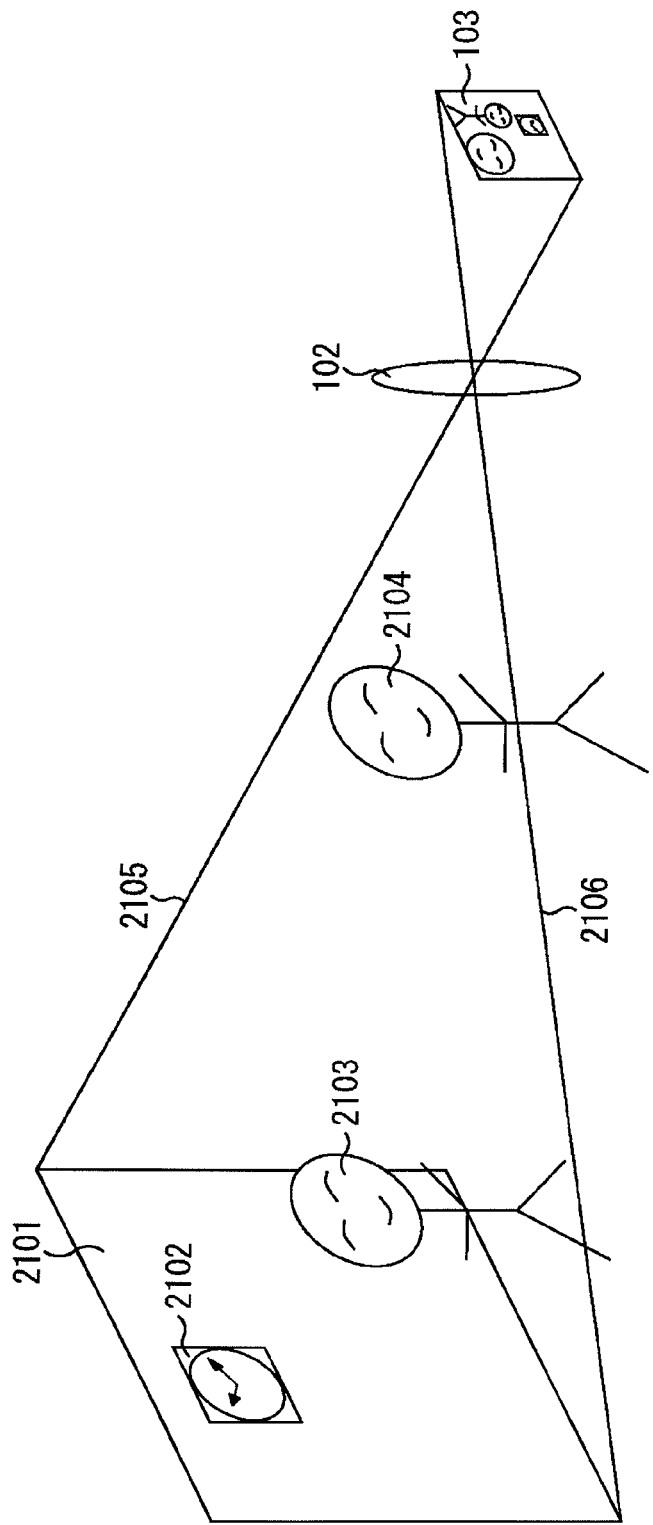

IMAGE PICKUP APPARATUS AND CONTROL METHOD FOR FLASH DISTRIBUTION

TECHNICAL FIELD

The present invention relates to an image pickup apparatus which picks up an image of an object by using a strobe, and a control method therefor.

BACKGROUND ART

With an image pickup apparatus such as a digital camera, strobe photographing has been conventionally carried out, which irradiates an object with a flash by using a strobe which is so-called a flash unit, to thereby photograph the object.

In the strobe photographing, generally, because of strobe light distribution characteristics, a flash is not uniformly distributed onto the object. Therefore, the object may look brighter at its center and darker at its periphery, or the object may look brighter as it is nearer, and darker as it is farther because it is unreachable by the flash.

Conventionally available techniques regarding strobe photographing are, for example, disclosed in Japanese Patent Application Laid-Open Nos. H11-331575, 2003-283922, and 2005-354167. Specifically, Japanese Patent Application Laid-Open No. H11-331575 discusses an image processing technique of obtaining, in portrait photographing with a wall set as a background, a distance of a person as a main object from information of the object, and correcting brightness based on light distribution characteristics in strobe photographing. Japanese Patent Application Laid-Open No. 2003-283922 discusses a technique of correcting an image based on light distribution characteristics including lens characteristics in strobe photographing. Japanese Patent Application Laid-Open No. 2005-354167 discusses a technique of correcting an image according to light distribution characteristics dependent on an object distance on the basis of pieces of distance measurement information of some places in strobe photographing.

However, the conventional techniques discussed in Japanese Patent Laid-Open Nos. H11-331575, 2003-283922, and 2005-354167 have had difficulties of removing local light distribution unevenness caused by the strobe (flash unit), from an image photographed by the strobe photographing.

DISCLOSURE OF THE INVENTION

To solve the problem, the present invention provides a technique of removing local light distribution unevenness caused by a flash unit, from an image photographed by using the flash unit.

According to an aspect of the present invention, an image pickup apparatus comprises a flash unit which emits a flash to an object; a first image obtaining unit which converts an optical image of the object formed by an optical unit into an electric signal to obtain a first image regarding photographing of the object; a second image obtaining unit which cinverts the optical image of the object into an electric signal to obtain a second image for measurement of distance distribution of the object; a distance measurement unit which measures a distance from the object for each image area of the first image on the basis of the second image; a storing unit which stores light distribution characteristic data regarding light distribution characteristics of the flash unit; and a correction unit which corrects the first image on the basis of the distance from the object measured by the distance measurement unit for each image area and the light distribution characteristic data corresponding to the distance of the object.

According to another aspect of the present invention, a control method for an image pickup apparatus including a flash unit for emitting a flash to an object and a storing unit for storing light distribution characteristic data regarding light distribution characteristics of the flash unit, comprises: a first image obtaining step of converting an optical image of the object formed by an optical unit into an electric signal to obtain a first image regarding photographing of the object; a second image obtaining step of converting the optical image of the object into an electric signal to obtain a second image for measurement of distance distribution of the object; a distance measurement step of measuring a distance from the object for each image area of the first image on the basis of the second image; and a correction step of correcting the first image on the basis of the distance from the object measured in the distance measurement step for each image area and the light distribution characteristic data corresponding to the distance of the object.

Further features of the present invention become apparent from the following description of an exemplary embodiment with reference to the attached drawings.

BRIEF DESCRIPTION OF THE DRAWINGS

FIG. 2 is a flowchart illustrating an example of a processing procedure in a control method for the digital camera (image pickup apparatus) according to the embodiment of the present invention.

FIGS. 3A, 3B and 3C are schematic diagrams each illustrating an example of a basic pixel array of a general image pickup element.

FIGS. 4A and 4B are schematic diagrams each illustrating an example of a basic pixel array of an image pickup element according to the embodiment of the present invention.

FIGS. 6A and 6B are schematic diagrams each illustrating an example of a pixel structure of the image sensor (color pixel) of the image pickup element according to the embodiment of the present invention.

FIG. 7 is a schematic diagram illustrating an example of a pixel array of the image pickup element according to the embodiment of the present invention.

FIG. 11 is a schematic diagram illustrating a modified example of a pixel array of the image pickup element according to the embodiment of the present invention.

FIG. 12 is a schematic diagram illustrating a modified example of a pixel array of the image pickup element according to the embodiment of the present invention.

FIG. 21 is a schematic diagram illustrating a status of strobe photographing of an object which uses the digital camera (image pickup apparatus) according to the embodiment of the present invention.

BEST MODE FOR CARRYING OUT THE INVENTION

A preferred embodiment of the present invention will now be described in detail in accordance with the accompanying drawings.

An embodiment of the present invention is described below by way of an example where a digital camera is applied as an image pickup apparatus of the present invention.

Figure 1:
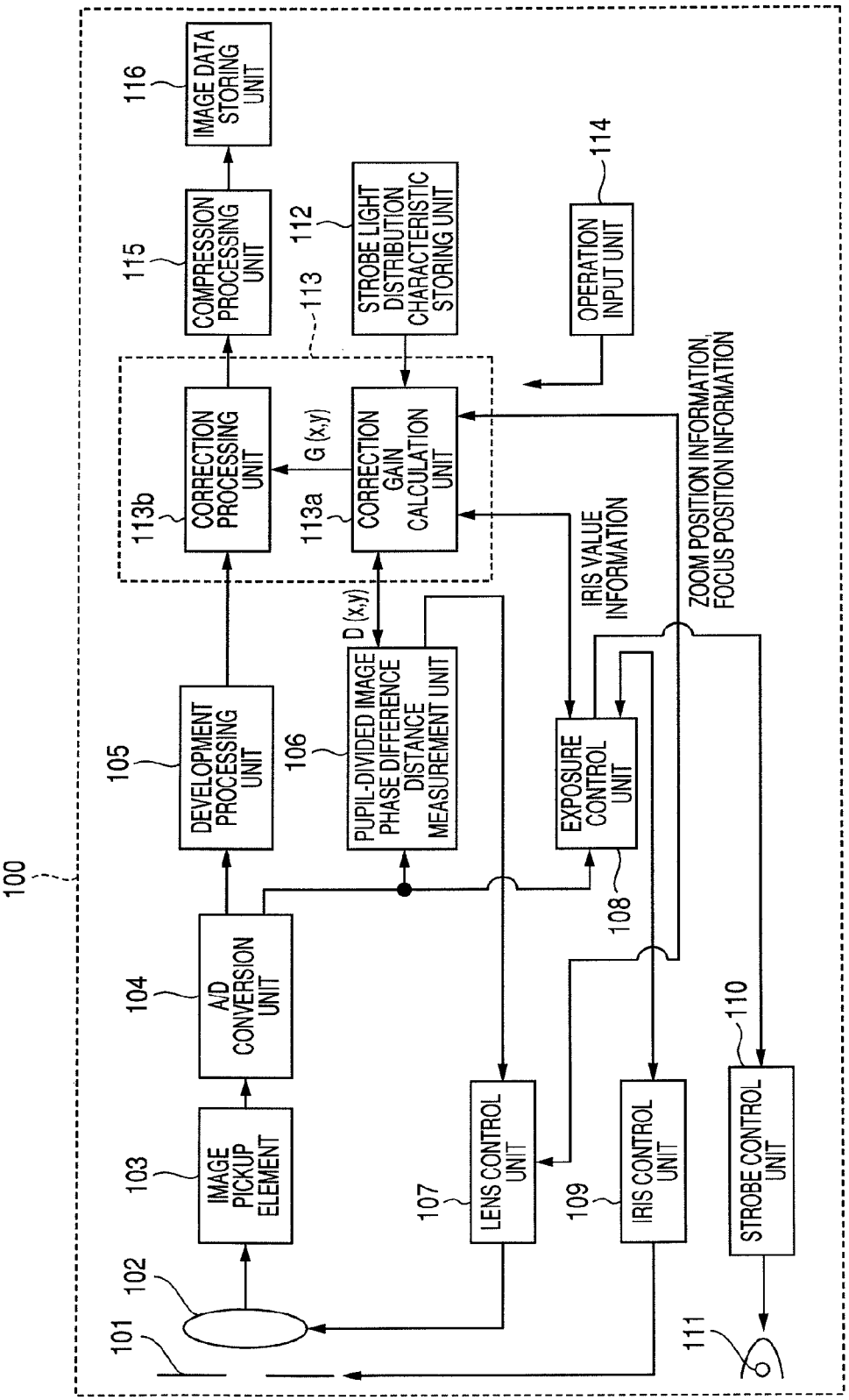
FIG. 1 is a block diagram illustrating an example of an internal configuration of a digital camera (image pickup apparatus) according to an embodiment of the present invention.

FIG. 1 is a block diagram illustrating an example of an internal configuration of the digital camera (image pickup apparatus) according to the embodiment of the present invention.

A digital camera 100 of this embodiment includes an iris 101, a photographing lens 102, an image pickup element 103, an A/D conversion unit 104, a development processing unit 105, a pupil-divided image phase difference distance measurement unit 106, a lens control unit 107, an exposure control unit 108, and an iris control unit 109. The digital camera 100 of this embodiment further includes a strobe control unit 110, a strobe 111, a strobe light distribution characteristic storing unit 112, a correction unit 113, an operation input unit 114, a compression processing unit 115, and an image data storing unit 116. The correction unit 113 includes a correction gain calculation unit 113a and a correction processing unit 113b.

The iris 101 adjusts an amount of light to be guided into the digital camera 100, and its aperture diameter can be changed based on photographing conditions. This iris 101 is controlled by the iris control unit 109.

The photographing lens 102 has a function of guiding an optical image of an object to the image pickup element 103, and includes one or a plurality of lenses including a focus lens. The photographing lens 102 is controlled by the lens control unit 107.

The image pickup element 103 includes pixels two-dimensionally arranged on the same plane. In each pixel, the image pickup element 103 converts the optical image (object image) of the object guided by the photographing lens 102 into an electric signal (image signal) of an analog signal to pick up an image of the object. The image pickup element 103 includes, for example, a CCD sensor or a CMOS sensor.

The A/D conversion unit 104 converts the image signal of the analog signal output from the image pickup element 103 into an image signal of a digital signal.

The development processing unit 105 converts the image signal output from the A/D conversion unit 104 from an RGB signal into a YUV signal to perform development processing.

The pupil-divided image phase difference distance measurement unit 106 performs processing of measuring a distance from the object for each image area of the photographed image based on a pixel signal from a distance measurement pixel disposed in the image pickup element 103. Specifically, the pupil-divided image phase difference distance measurement unit 106 extracts the pixel signal from the distance measurement pixel disposed in the image pickup element 103, from an output of the A/D conversion unit 104, and obtains object distance distribution of an image photographed within an angle of view based on pupil-divided images A and B.

The lens control unit 107 controls a focus lens of the photographing lens 102 according to distance measurement information obtained by the pupil-divided image phase difference distance measurement unit 106.

The exposure control unit 108 determines photographing conditions to enable photographing with appropriate exposure, based on the image signal output from the A/D conversion unit 104.

The iris control unit 109 controls the iris 101 according to the photographing conditions (exposure conditions) determined by the exposure control unit 108.

The strobe control unit 110 controls the strobe 111 according to the photographing conditions (exposure conditions) determined by the exposure control unit 108.

The strobe 111 emits a flash to the object when necessary due to underexposure or the like under control of the strobe control unit 110.

The strobe light distribution characteristic storing unit 112 stores strobe light distribution characteristic data indicating light distribution characteristics of the strobe 111 characterized by zoom and focus positions of the photographing lens 102, an iris value of the iris 101, or an object distance.

The correction unit 113 performs correction processing of the photographed image on the basis of a distance of the object in each image area of the photographed image measured by the pupil-divided image phase difference distance measurement unit 106, and the light distribution characteristic data stored in the strobe light distribution characteristic storing unit 112.

The correction gain calculation unit 113a of the correction unit 113 calculates a gain when the photographed image data is corrected based on the zoom and focus positions of the photographing lens 102, the object distance distribution of the image photographed within the angle of view, in-focus conditions based on the iris value of the iris 101, and the strobe light distribution characteristic data.

The correction processing unit 113b of the correction unit 113 performs correction processing of the photographed image data on the basis of the gain calculated by the correction gain calculation unit 113a.

The operation input unit 114 enters input information entered by a user to the correction unit 113. For example, the operation input unit 114 includes a display screen for displaying a menu setting screen, and enters input information to the correction unit 113 via the menu setting screen.

The compression processing unit 115 performs processing of compressing the photographed image data corrected by the correction unit 113.

The image data storing unit 116 stores the image data compressed by the compression processing unit 115.

FIG. 2 is a flowchart illustrating an example of a processing procedure of a control method for the digital camera (image pickup apparatus) according to the embodiment of the present invention. Specifically, FIG. 2 mainly illustrates a processing procedure regarding image correction during strobe photographing.

First, in Step S1, for example, the correction unit 113 determines whether to carry out strobe photographing, on the basis of input information entered from the operation input unit 114. If a result of the determination indicates that strobe photographing is not carried out (S1/NO), the processing of the flowchart is finished.

On the other hand, if a determination result of Step S1 indicates that strobe photographing is carried out (S1/YES), the strobe 111 emits a flash to an object to photograph the object by the photographing lens 102 or the image pickup element 103. Thus, photographed image data of the object in the strobe photographing is obtained. Then, the process proceeds to Step S2.

In Step S2, the lens control unit 107 detects a current zoom position of the photographing lens 102 and a current focus position (focus lens position) of the photographing lens 102. Then, the correction gain calculation unit 113a of the correction unit 113 obtains zoom position information regarding the current zoom position of the photographing lens 102 and focus position information (focus lens position information) regarding the current focus position of the photographing lens 102 from the lens control unit 107.

In Step S3, the exposure control unit 108 obtains, from the iris control unit 109, iris value information regarding a current iris value of the iris 101 detected by the iris control unit 109. The correction gain calculation unit 113a obtains the iris value information regarding the current iris value of the iris 101 from the exposure control unit 108.

In Step S4, the correction gain calculation unit 113a obtains object distance distribution information regarding the object distance distribution measured by the pupil-divided image phase difference distance measurement unit 106. The object distance distribution information obtained by the pupil-divided image phase difference distance measurement unit 106 is described below.

In Step S5, the correction gain calculation unit 113a calculates an image correction gain on the basis of different types of information obtained in Steps S2 to S4 and the strobe light distribution characteristic data stored in the strobe light distribution characteristic storing unit 112. The strobe light distribution characteristic data and the method of calculating the image correction gain by the correction gain calculation unit 113a are described below in detail.

In Step S6, the correction processing unit 113b of the correction unit 113 performs processing of correcting the photographed image data obtained by the strobe photographing of Step S1 by using the image correction gain calculated by the correction gain calculation unit 113a. The correction processing of the correction processing unit 113b is described below in detail.

Subsequently, the photographed image data corrected by the correction unit 113 is compressed by the compression processing unit 115 to be stored in the image data storing unit 116. Then, the processing of the flowchart is finished.

Steps S7 and S8 illustrated in FIG. 2 enable insertion of determination processing as to whether to proceed from Step S1 to Step S2 under conditions described later. Steps S7 to S9 illustrated in FIG. 2 are described below in detail referring to FIG. 40.

Phase Difference AF by Distance Measurement Pixel Disposed in Image Pickup Element 103

Next, auto-focus (phase difference AF) of a phase difference system according to this embodiment is described. First, referring to FIGS. 3A to 3C and FIGS. 4A and 4B, a pixel array of the image pickup element 103 that is a basis for phase difference AF is described.

Figures 3A, 3B, 3C:
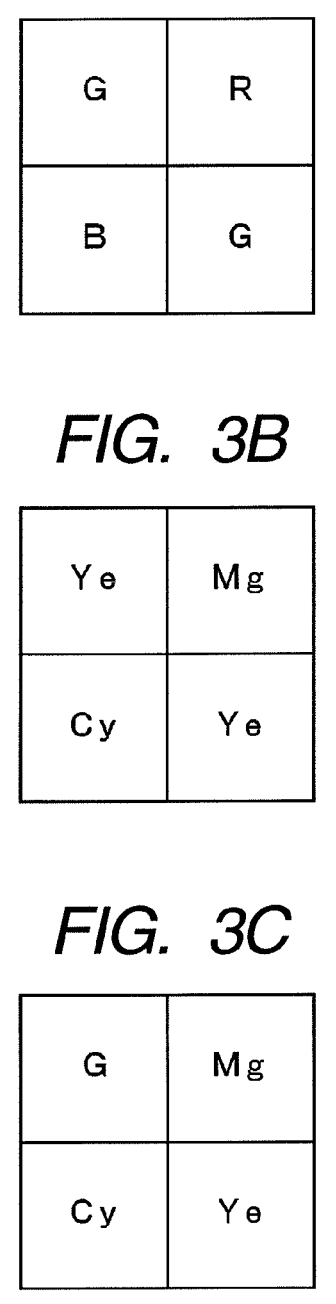
Figures 4A, 4B:
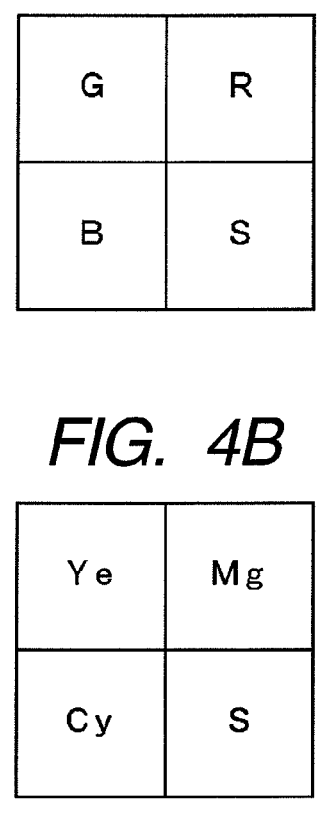

FIGS. 3A to 3C are schematic diagrams each illustrating an example of a basic pixel array of a general image pickup element. FIGS. 4A and 4B are schematic diagrams each illustrating an example of a basic pixel array of the image pickup element 103 according to the embodiment of the present invention.

First, the basic pixel array of the general image pickup element illustrated in FIGS. 3A to 3C is described. Each of FIGS. 3A to 3C illustrates a color array included in a basic unit portion of an area sensor where a basic unit is 2 pixels×2 pixels. FIG. 3A illustrates a so-called Bayer array, which is referred to as a pure color Bayer array below. FIG. 3B illustrates an example where the Bayer array is applied to a complementary color filter, which is referred to as a complementary color Bayer array below. FIG. 3C illustrates three complementary color filters with G, which is referred to as a complementary color array with G below.

As a generally known basic pixel array, in addition to the basic pixel arrays illustrated in FIGS. 3A to 3C, for example, there is a complementary color checkered array of a unit of 2 pixels×4 pixels, which is often used as an image pickup element for a video movie camera. As another generally known basic pixel array, for example, there is a complementary color checkered array of 2 pixels×8 pixels (refer to Japanese Patent Application Laid-Open No. H09-46715). The color pixel arrays of 2 pixels×4 pixels and 2 pixels×8 pixels are more advantageous as area sensors for processing moving images (videos performing interlace scanning). As a camera for processing still images, the array of 2 pixels×2 pixels is more advantageous in that signal processing can be simplified and a high-quality image can be obtained. The area sensor with 2 pixels×2 pixels set as a basic unit is described below. However, this arrangement can be applied to the area sensors having color pixel arrays of 2 pixels×4 pixels and 2 pixels×8 pixels.

Next, referring to FIGS. 4A and 4B, the basic pixel array of the image pickup element 103 of this embodiment is described. FIG. 4A illustrates a pixel array in the case of a pure color Bayer array, while FIG. 4B illustrates a pixel array in the case of a complementary color Bayer array or a complementary color array with G.

In FIGS. 4A and 4B, a portion "S" is a function sensor cell (distance measurement pixel) for reading photometry data regarding distance measurement for AF. In the image pickup element 103 of this embodiment, a distance measurement pixel equivalent to an AF sensor is included in the image pickup element 103 itself, and distance measurement for AF of the digital camera is carried out by reading a signal from the image pickup element 103. Through this arrangement, this embodiment enables highly accurate AF. There is no need to dispose any other AF sensors, and hence a compact and low-cost digital camera can be provided.

Next, a pixel (distance measurement pixel) to detect photometry data for AF distance measurement and the image pickup element 103 including the distance measurement pixel according to this embodiment is described.

As an image pickup element for a digital still camera of a large number of pixels, mainly, an interline-type CCD or a full-frame type CCD is used. The interline-type CCD is often used for a low-cost camera equal to or less than a ⅔-inch optical system, while the full-frame type CCD is often used for a high-cost camera equal to or more than a 1-inch optical system. A biggest difference between these types is that signal charges can be read even if a light enters the image pickup element in the case of the interline-type CCD while no signal charge can be read unless a mechanical shutter disposed in the front of the image pickup element is closed in the case of the full-frame type CCD.

The inventors of the present invention have offered a solution by proposing an improved full-frame type CCD of a structure which includes a storage unit for storing charges of a few lines between an image area of the full-frame type CCD and a horizontal CCD. The inventors of the present invention have offered a partial reading driving method for AF in an opened state of the mechanical shutter based on the improved full-frame type CCD. Additionally, the inventors of the present invention have offered a method of partially reading only a part of the image area necessary for AF, at high speed (high-speed clearing method for signal charges other than necessary portion) in the case of the interline-type CCD.

The inventors of the present invention have offered a solution by proposing a improved full-frame type CCD of a structure which includes a storage unit for storing charges of a few lines between an image area of the full-frame type CCD and a horizontal CCD. The inventors of the present invention have offered a partial reading driving method for AF in an opened state of the mechanical shutter based on the improved full-frame type CCD. Additionally, the inventors of the present invention have offered a method of partially reading only a part of the image area necessary for AF, at high speed (high-speed clearing method for signal charges other than necessary portion) in the case of the interline-type CCD.

Thus, both in the interline-type CCD and in the full-frame type CCD (improved type), signal charges of an area including the distance measurement pixel set in the image area can be read without opening/closing the mechanical shutter many times within a short period of time. An example of the embodiment using the improved full-frame type CCD is described below. However, the example can be applied to the interline-type CCD.

Before description of the distance measurement pixel, the image sensor (color pixel) of the image pickup element 103 is described.

Figure 5B:
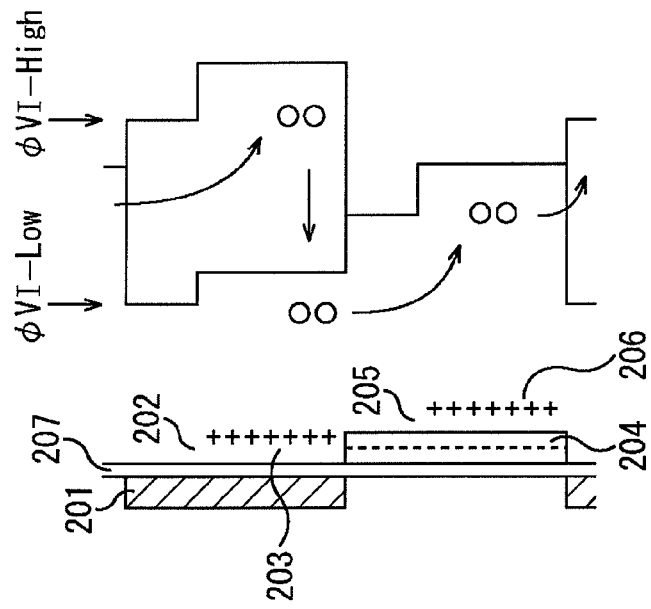
FIGS. 5A and 5B are schematic diagrams each illustrating an example of a pixel structure of an image sensor (color pixel) of the image pickup element according to the embodiment of the present invention.
Figure 5A:
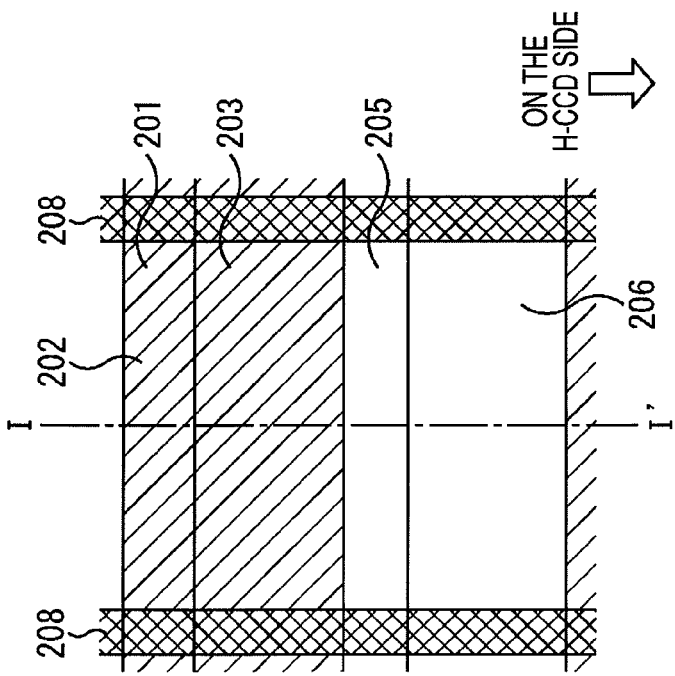

FIGS. 5A and 5B are schematic diagrams each illustrating an example of a pixel structure of the image sensor (color pixel) of the image pickup element 103 according to the embodiment of the present invention. FIG. 5A illustrates a structure of the pixel of the image sensor of the image pickup element 103 when viewed from the top, while FIG. 5B illustrates a pixel structure of a section cut on the line I-I' of FIG. 5A and its potential profile. Specifically, each of FIGS. 5A and 5B mainly illustrates a photoelectric conversion unit in the pixel of the image sensor.

In FIGS. 5A and 5B, a clock gate electrode 201 is made of, for example, light-transparent polysilicon. A semiconductor layer surface under the clock gate electrode 201 is a clock phase area. The clock phase area is divided into two areas by ion implantation. One is a clock barrier area 202, and the other area is a clock well area 203 formed by implanting ions so as to set higher potential than in the clock barrier area 202.

A virtual gate 204 is for fixing channel potential by forming a $P^+$ layer in the semiconductor layer surface, and this formed area is a virtual phase area. The virtual phase area is divided into two areas by implanting N-type ions to a layer deeper than the $P^+$ layer. One is a virtual barrier area 205, and the other is a virtual well area 206.

An insulation layer 207 is made of, for example, an oxide film, and disposed between the electrode and the semiconductor layer. A channel stop area 208 is for isolating a channel of each VCCD.

Though not illustrated in FIGS. 5A and 5B, a function of preventing a blooming phenomenon where charges overflow into an adjacent pixel to generate a false signal when a strong light enters, is added. Its representative method is a method where a horizontal overflow drain is disposed. Specifically, a drain including an $N^+$ layer is disposed adjacently to each VCCD and an overflow drain barrier is disposed between the overflow drain and a charge transfer channel. In other words, charges exceeding a height of the overflow drain barrier are swept away by the drain. The height of the overflow drain barrier is fixed by ion implantation. However, disposing an electrode (overflow drain barrier electrode) on the overflow drain barrier enables changing of the height under control of a value of a voltage (VOD) applied to the drain electrode.

For VCCD transfer, an arbitrary pulse is added to the clock gate electrode 201, and potential of the clock phase area is moved up and down with respect to potential of the virtual phase area, thereby transferring charges toward the horizontal CCD. A concept of the charge movement is indicated by "→○" of FIG. 5B.

The pixel structure of the image sensor of the image pickup element 103 has been described. A pixel structure of the storage unit described above is similar. However, in the area of the storage unit, the pixel upper part is aluminum light-shielded, eliminating the necessity of preventing blooming. Thus, an overflow drain is omitted. An H-CCD has a virtual phase structure, and a layout of a clock phase area and a virtual phase area is configured so that charges can be received from the VCCD and transferred horizontally.

FIGS. 6A and 6B are schematic diagrams each illustrating an example of a pixel structure of the image sensor (color pixel) of the image pickup element 103 according to the embodiment of the present invention. Specifically, FIGS. 6A and 6B illustrate the pixel structure of the image sensor which includes a color filter in an upper part of the pixel structure (mainly, photoelectric conversion unit) illustrated in FIGS. 5A and 5B. In FIGS. 6A and 6B, components similar to those of FIGS. 5A and 5B are denoted by similar reference numerals. FIG. 6A illustrates the structure when the pixel of the image sensor of the image pickup element 103 is seen from the top, and FIG. 6B illustrates the structure of the pixel of a section cut on the line 6B-6B of FIG. 6A.

A passivation layer 209 is a passivation layer of the semiconductor layer surface formed in the pixel structure illustrated in FIGS. 5A and 5B. A metal layer 210 is a metal layer (metal light-shielding layer) formed between the pixel structure illustrated FIGS. 5A and 5B and a color filter 212 to prevent mixing of colors. The metal layer 210 may include a black pigment layer made of the same material as that of the color filter 212. A smoothing layer 211 is for smoothing a surface of the color filter 212. The color filter 212 includes one of pure colors or one of complementary colors. A passivation layer 213 is for protecting the color filter 212.

Next, a pixel array in a case where a pixel (distance measurement pixel) for detecting AF distance measurement data is configured in the image pickup element 103 including a full-frame type CCD is described.

FIG. 7 is a schematic diagram illustrating an example of a pixel array of the image pickup element 103 according to the embodiment of the present invention. In FIG. 7, a normal Bayer array sensor includes a line having a plurality of distance measurement pixels S1 and a line having a plurality of distance measurement pixels S2 arranged side by side.

Figure 8A:
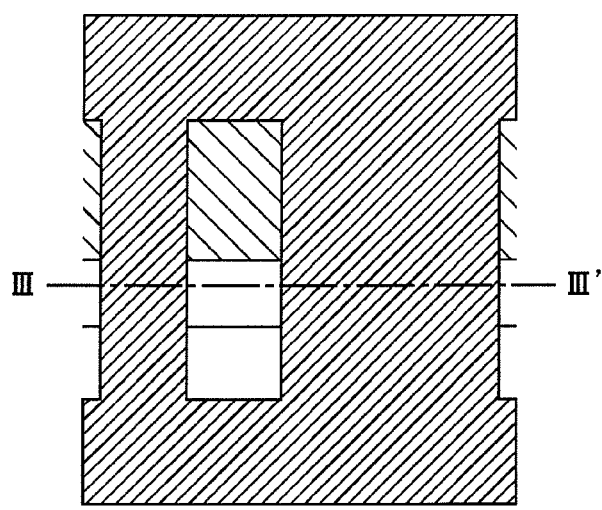
FIGS. 8A and 8B are schematic diagrams each illustrating an example of a pixel structure of a distance measurement pixel S1 illustrated in FIG. 7.
Figure 8B:
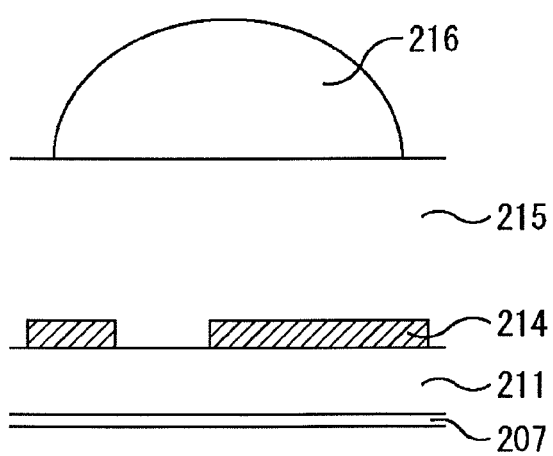

Pixel structures of the distance measurement pixels S1 and S2 illustrated in FIG. 7 are described. FIGS. 8A and 8B are schematic diagrams each illustrating an example of the pixel structure of the distance measurement pixel S1 illustrated in FIG. 7. FIG. 8A illustrates the structure when the distance measurement pixel S1 is seen from the top, and FIG. 8B illustrates the pixel structure of a section cut on the line III-III' of FIG. 8A. In FIGS. 8A and 8B, components similar to those of FIGS. 6A and 6B are denoted by similar reference numerals.

The distance measurement pixel S1 includes no color filter 212 disposed in the image sensor (color pixel) illustrated in FIGS. 6A and 6B but a micro lens 216 disposed in its uppermost part.

A light-shielding layer 214 is formed on the smoothing layer 211 illustrated in FIGS. 8A and 8B. The light-shielding layer 214 includes a smoothing layer 215 formed to form the micro lens 216 on a plane. This smoothing layer 215 is made of the same material as that of the passivation layer 213 of the image sensor illustrated in FIGS. 6A and 6B, and formed through the same process as that of the passivation layer 213. A characteristic configuration of the distance measurement pixel S1 is that on the same plane of the color mixing prevention light-shielding metal layer 210 in the image sensor illustrated in FIGS. 6A and 6B, the light-shielding layer 214 having an aperture unbalanced (eccentric) in one side (leftward) from a center of the photoelectric conversion area of the pixel is configured.

Figure 9A:
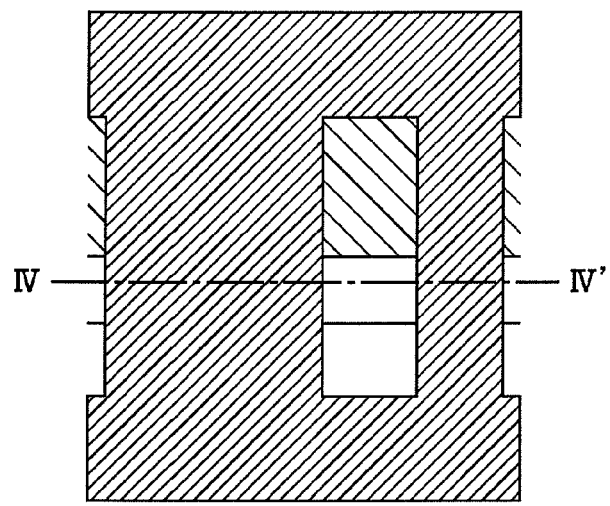
FIGS. 9A and 9B are schematic diagrams each illustrating an example of a pixel structure of a distance measurement pixel S2 illustrated in FIG. 7.
Figure 9B:
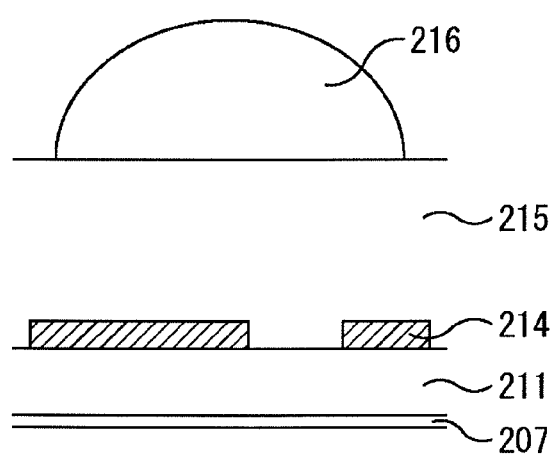

FIGS. 9A and 9B are schematic diagrams each illustrating an example of a pixel structure of the distance measurement pixel S2 illustrated in FIG. 7. FIG. 9A illustrates the structure when the distance measurement pixel S2 is seen from the top, and FIG. 9B illustrates the pixel structure of a section cut on the line IV-IV' illustrated in FIG. 9A. In FIGS. 9A and 9B, components similar to those of FIGS. 8A and 8B are denoted by similar reference numerals.

In the distance measurement pixel S2 illustrated in FIGS. 9A and 9B, a light-shielding layer 214 is formed so that it can be provided with an aperture in the same distance from a pixel center in a direction opposite to that of the distance measurement pixel S1 illustrated in FIGS. 8A and 8B.

In the image pickup element 103 including more than 1 million pixels, in the pixel array of FIG. 7, proximate optical images are formed on the micro lens 216 so that the row groups respectively including the distance measurement pixels S1 and S2 are considered as almost the same line. As long as the photographing lens 102 for forming an optical image in the image pickup element 103 is in-focus on the image pickup element 103, an image signal (pixel signal) from the row group including the distance measurement pixel S1 and an image signal (pixel signal) from the row group including the distance measurement pixel S2 match each other. If an image forming point connecting a focus of the photographing lens 102 is before or after the image area of the image pickup element 103, a phase difference is generated between the image signal from the row group including the distance measurement pixel S1 and the image signal from the row group including the distance measurement pixel S2. In this case, deviation directions of phases are opposite between when the image forming point is before the image area and when it is after the image area. In principle, this phase difference is similar to the pupil-divided image phase difference AF described in Japanese Patent Application Laid-Open No. H09-43507. In other words, when the photographing lens 102 is viewed from the photoelectric conversion unit of the distance measurement pixel S1 and when the photographing lens 102 is viewed from the photoelectric conversion unit of the distance measurement pixel S2, a pupil looks divided into left and right around an optical center.

Figure 10A:
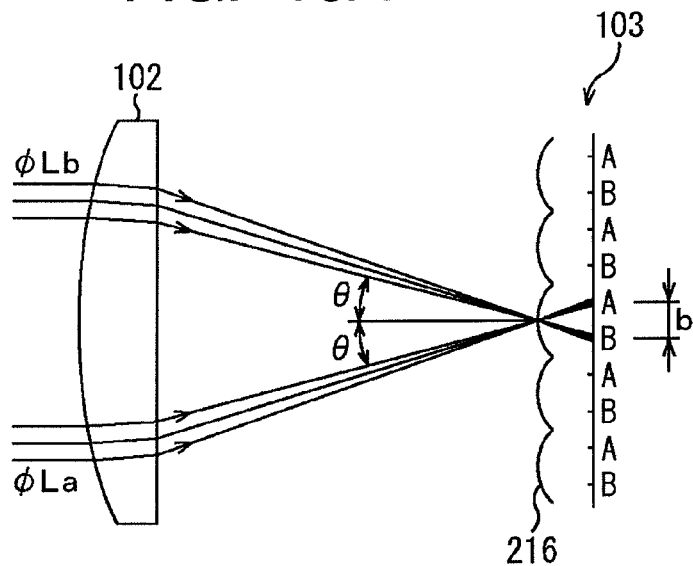
FIGS. 10A and 10B are conceptual diagrams of detection of image deviation caused by an out-of-focus state of the image pickup element according to the embodiment of the present invention.
Figure 10B:
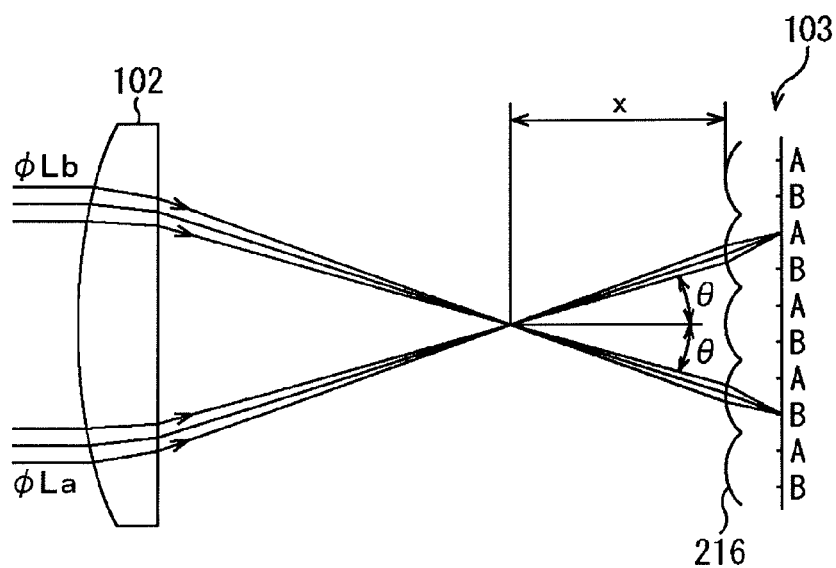

FIGS. 10A and 10B are conceptual diagrams of detection of image deviation caused by an out-of-focus state of the image pickup element 103 according to the embodiment of the present invention. In FIGS. 10A and 10B, the distance measurement pixels S1 and S2 match each other, and are indicated by points A and B. For easier understanding, the color pixel (image sensor) is omitted.

A light from a specific point of the object is divided into a light flux (ΦLa) passed through a pupil of A to enter the point A and a light flux (ΦLb) passed through a pupil of B to enter the point B. These two light fluxes are originally emitted from one point (specific point of the object). Thus, as long as an in-focus position of the photographing lens 102 is on the image pickup element 103, as illustrated in FIG. 10A, the light fluxes reach one point in the same micro lens 216. However, as illustrated in FIG. 10B, if an in-focus position of the photographing lens 102 is before the image pickup element 103 by a distance x, phases deviate from each other by 2θx. In this case, a reaching point deviates in an opposite direction with the distance x.

According to this principle, an image (signal line based on light intensity) formed by an A array and an image formed by a B array match each other as long as the photographing lens 102 is in-focus, and phases deviate from each other if not in-focus.

Based on this principle, the image pickup element 103 of this embodiment is formed by incorporating distance measurement pixels having micro lenses 216 of different aperture positions in the basic pixel array. Specifically, the image pickup element 103 is formed by disposing an area for adjacently arranging a row group of the basic pixel array including the distance measurement pixel S1 having a first aperture and a row group of the basic pixel array including the distance measurement pixel S2 having a second aperture. According to this embodiment, a phase deviation amount between image signals from the row groups respectively including the distance measurement pixels S1 and S2 of this area is calculated for detection to obtain an out-of-focus amount of the photographing lens 102. Moving a focus position of the digital camera 100 by the obtained out-of-focus amount enables auto focusing.

Figures 13, 14:
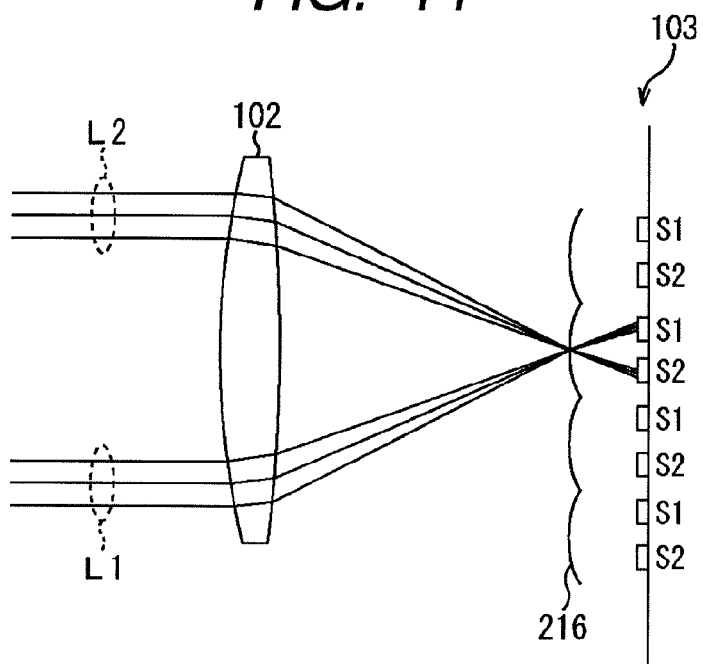
FIG. 13 is a schematic diagram illustrating a modified example of a pixel array of the image pickup element according to the embodiment of the present invention.
FIG. 14 is a conceptual diagram of focus detection of the digital camera (image pickup apparatus) according to the embodiment of the present invention.

FIGS. 11, 12 and 13 are schematic diagrams each illustrating a modified example of a pixel array of the image pickup element 103 according to the embodiment of the present invention. FIGS. 11 to 13 illustrate ways of arranging the distance measurement pixels S1 and S2 changed from that of the pixel array illustrated in FIG. 7.

In the aforementioned example, the row group including the distance measurement pixel S1 for detecting a first phase and the row group including the distance measurement pixel S2 for detecting a second phase slightly deviate from each other. As described above, this arrangement poses no practical problems in the image pickup element 103 including more than 1 million pixels. In the modified examples of FIGS. 11 to 13, the row groups for detecting the phases are brought closer to the same place.

Specifically, FIG. 11 illustrates an alternate arrangement of the distance measurement pixels S1 and S2 on the same line. FIG. 12 illustrates an arrangement of row groups including the distance measurement pixels S1 above and below the row group including the distance measurement pixel S2. In this case, data of the row group including the distance measurement pixel S1 equivalent to the row group including the distance measurement pixel S2 is obtained by interpolation between the row groups respectively including the distance measurement pixel S1 and the distance measurement pixel S2. FIG. 13 illustrates a modified example of FIG. 11, where two row groups including the distance measurement pixels S1 and S2 on the same line are disposed adjacently to each other, and positions of the distance measurement pixels S1 and S2 are opposite to each other between the two row groups.

Thus, the driving method of reading the pixel group (row group including the distance measurement pixel) for generating a phase difference signal and only a part thereof enables high-speed and highly accurate AF.

In image processing for RAW data (CCD-ROW data; direct information of each pixel) regarding an image photographed in the image pickup element 103, the distance measurement pixels S1 and S2 are processed to obtain an image by interpolation from the surrounding color pixels. Thus, the image pickup element 103 can be realized, which can not only fetch a photographed image but also read distance measurement data for AF with almost no deterioration of image quality of the photographed image. On the presumption that such interpolation processing is executed, in the case of a basic pixel array of 2 pixels×2 pixels similar to that of FIGS. 4A and 4B, with three color pixels, and one distance measurement pixel, interpolation processing is simple, and image deterioration is little troublesome. Needless to say, this arrangement is applicable even in the case of a basic pixel array of 2 pixels×4 pixels. In this case, a distance between the row group including the distance measurement pixel S1 and the row group including the distance measurement pixel S2 is larger than that of 2 pixels×2 pixels.

The case where the image pickup element 103 is the improved full-frame type CCD has been described. The same applies even when the image pickup element 103 is an inter-line-type CCD, a frame transfer type CCD, or an X-Y address type image pickup element.

Next, further improvable points of this embodiment are described.

Figure 15:
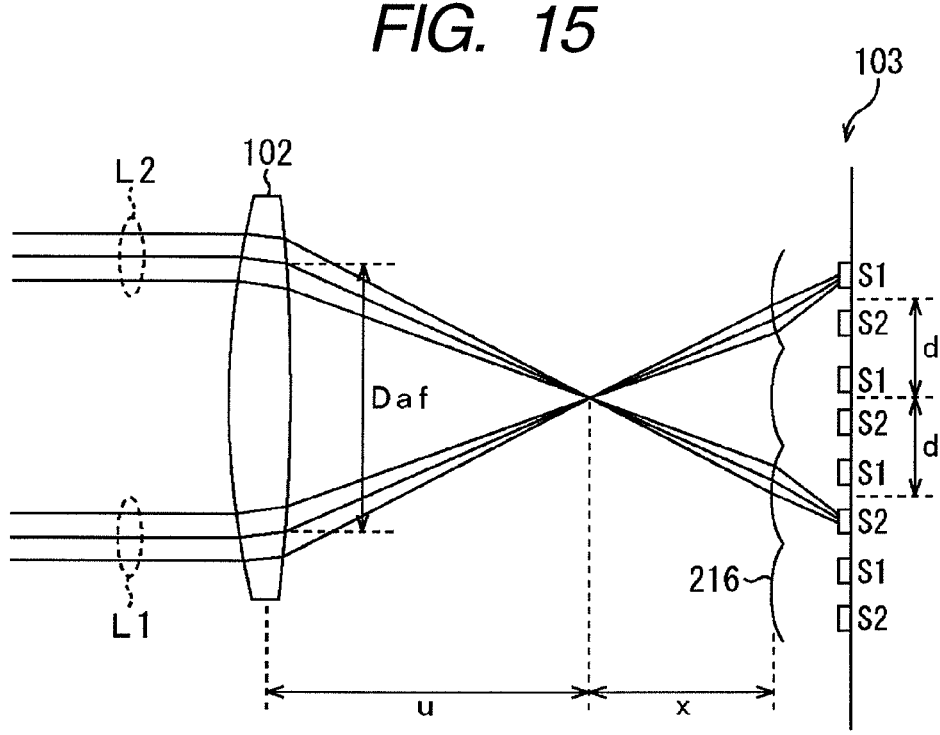
FIG. 15 is a conceptual diagram of focus detection of the digital camera (image pickup apparatus) according to the embodiment of the present invention.

FIGS. 14 and 15 are conceptual diagrams of focus detection of the digital camera (image pickup apparatus) according to the embodiment of the present invention. For easier understanding, the distance measurement pixels S1 and S2 are illustrated on the same plane.

A light from a specific point of the object is divided into a light flux (L1) passing through a pupil of the distance measurement pixel S1 to enter the distance measurement pixel S1 and a light flux (L2) passing through a pupil of the distance measurement pixel S2 to enter the distance measurement pixel S2. When the photographing lens 102 of the digital camera 100 is in-focus, these two light fluxes are converged on one point on the surface of the micro lens 216 as illustrated in FIG. 14. In this case, the same optical image is exposed in the distance measurement pixels S1 and S2. Thus, an image signal read from the row group including the distance measurement pixel S1 and an image signal read from the row group including the distance measurement pixel S2 are identical.

On the other hand, when the photographing lens 102 of the digital camera 100 is out-of-focus, as illustrated in FIG. 15, the light fluxes L1 and L2 intersect each other at a position different from the surface of the micro lens 216. It is presumed here that a distance between the surface of the micro lens 216 and a intersection point of the two light fluxes, in other words, a defocus amount, is x, and a deviation amount between an image of the distance measurement pixel S1 and an image of the distance measurement pixel S2 occurring at this time is n. As illustrated in FIG. 15, a sensor pitch is d, a distance between centers of gravity of two pupils is Daf, and a distance from a principal point of the photographing lens 102 to a focus is u.

In this case, the defocus amount x is calculated by the following equation (1):

$$x = n \times d \times u / Daf \quad (1)$$

The distance u is expected to be almost equal to a focal length f of the photographing lens 102. The equation (1) is accordingly represented by the following equation (2):

$$x = n \times d \times f / Daf \quad (2)$$

Figure 16:
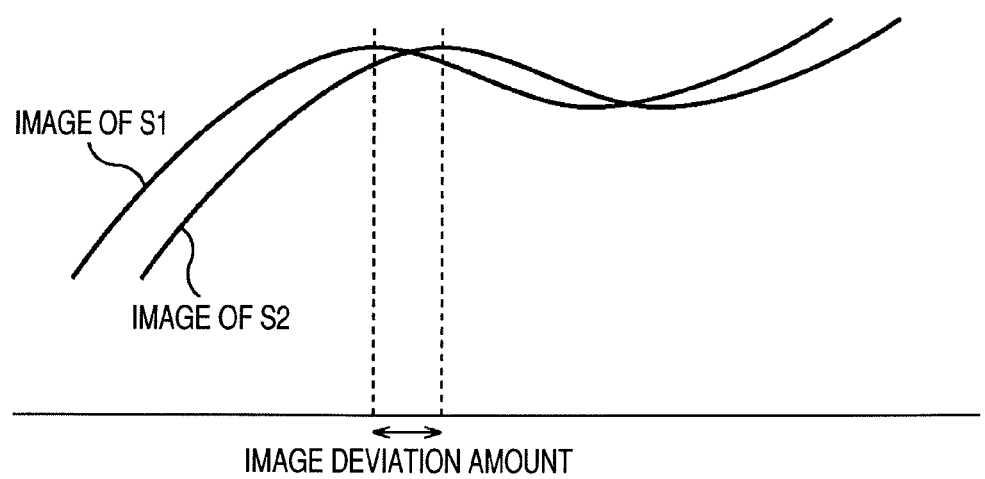
FIG. 16 is a schematic diagram illustrating a status of pixel signals read from row groups respectively including the distance measurement pixels S1 and S2 of the image pickup element according to the embodiment of the present invention.

FIG. 16 is a schematic diagram illustrating a status of image signals read from the row groups respectively including the distance measurement pixels S1 and S2 of the image pickup element 103 according to the embodiment of the present invention. FIG. 16 illustrates, for example, the case illustrated in FIG. 15.

Image deviation n×d occurs between the image signals read from the row groups respectively including the distance measurement pixels S1 and S2. A deviation amount is obtained between these two image signals, thereby obtaining a defocus amount x by the equation (2). Moving the photographing lens 102 by a distance x based on the obtained defocus amount x enables achievement of auto focusing.

To detect such image deviation, in the light that enters the photographing lens 102, the light fluxes L1 and L2 passing through two different pupils have to be separated from each other. According to this embodiment, pupil separation is carried out by forming distance measurement pixels S1 and S2 having pupil separation functions in the image pickup element 103.

Figure 17A:
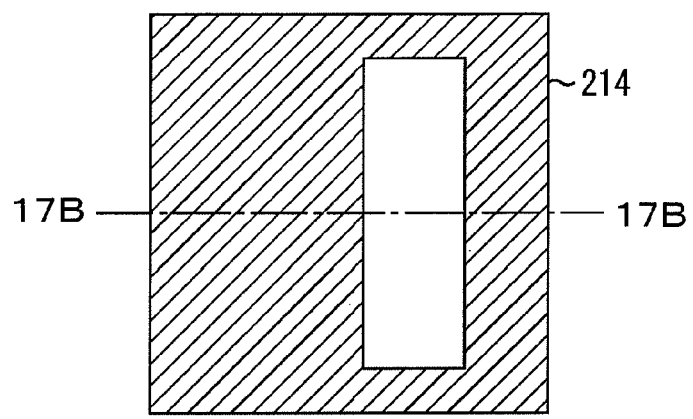
FIGS. 17A and 17B are schematic diagrams each illustrating an example of a pixel structure of a distance measurement pixel of the image pickup element according to the embodiment of the present invention.
Figure 17B:
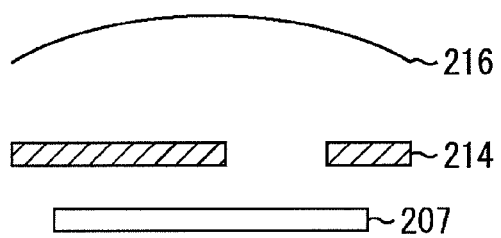

FIGS. 17A and 17B are schematic diagrams each illustrating an example of a pixel structure of the distance measurement pixel of the image pickup element 103 according to the embodiment of the present invention. FIG. 17A illustrates the structure when the distance measurement pixel is seen from the top, and FIG. 17B illustrates the pixel structure of a section cut on the line 17B-17B of FIG. 17A. The pixel structure of the distance measurement pixel illustrated in FIGS. 17A and 17B is, for example, similar to that illustrated in FIGS. 9A and 9B.

FIG. 17B illustrates the micro lens 216, the light-shielding layer 214, and an insulation layer 207 of a photoelectric conversion element. A light enters the micro lens 216 from the photographing lens 102. A light that enters the photoelectric conversion element is only a light flux entering from a specific direction limited by the light-shielding layer 214.

Figure 18A:
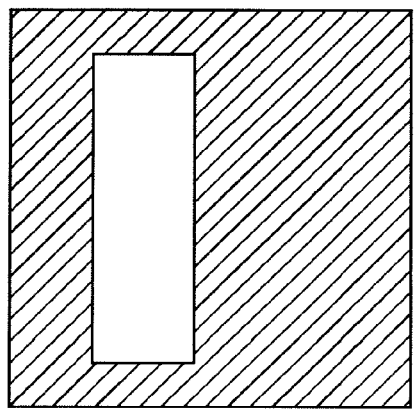
FIGS. 18A and 18B are schematic diagrams illustrating light-shielding layers in the distance measurement pixels S1 and S2 of the image pickup element according to the embodiment of the present invention.
Figure 18B:
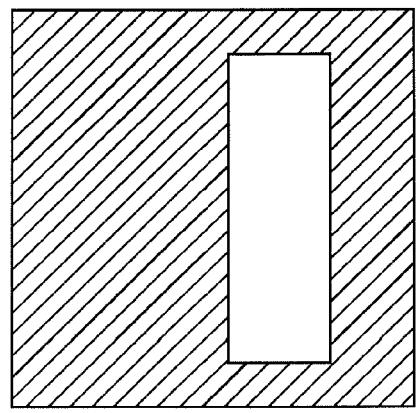

FIGS. 18A and 18B are schematic diagrams illustrating the light-shielding layers 214 in the distance measurement pixels S1 and S2 of the image pickup element 103 according to the embodiment of the present invention. FIG. 18A illustrates the light-shielding layer 214 of the distance measurement pixel S1 as illustrated in FIGS. 8A and 8B. FIG. 18B illustrates the light-shielding layer 214 of the distance measurement pixel S2 as illustrated in FIGS. 9A and 9B.

As illustrated in FIGS. 18A and 18B, the light-shielding layers 214 of the distance measurement pixels S1 and S2 are disposed so that apertures thereof can be left-right symmetrical. In this case, the apertures may be up-down symmetrical. Thus, light fluxes from two pupil positions symmetrical around an optical axis subject one of images formed on the image pickup element 103 to photoelectric conversion by the row group including the distance measurement pixel S1, and the other to photoelectric conversion by the row group including the distance measurement pixel S2. In this way, two images of different pupil positions can be obtained.

Figure 19:
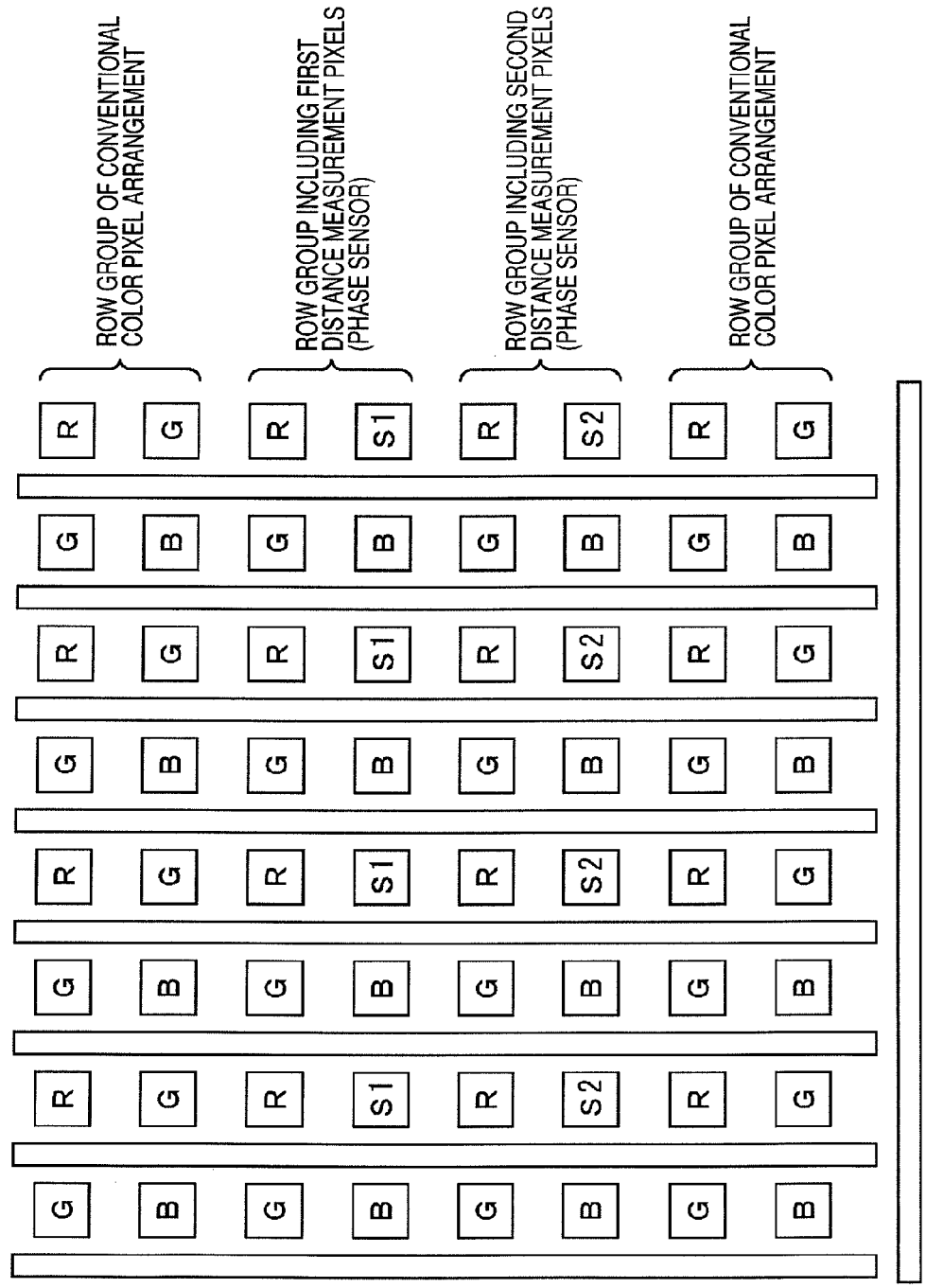
FIG. 19 is a schematic diagram illustrating an example of a pixel array of the image pickup element according to the embodiment of the present invention.

FIG. 19 is a schematic diagram illustrating an example of a pixel array of the image pickup element 103 according to the embodiment of the present invention. FIG. 19 illustrates the same pixel array as that of FIG. 7.

A color pixel of the image pickup element 103 illustrated in FIG. 19 includes a color filter of R, G or B. In FIG. 19, R indicates a color pixel having a red color filter, G indicates a color pixel having a green color filter, and B indicates a color pixel having a blue color filter. The distance measurement pixels S1 and S2 include no color filters but the light-shielding layers 214 and the micro lenses 216 as illustrated in FIG. 17B.

To perform an auto focus operation, the row groups including the distance measurement pixels S1 and S2 are read from the image pickup element 103, thereby subjecting a signal output from the image pickup element 103 to A/D conversion at the A/D conversion unit 104. Then, for example, the pupil-divided image phase difference distance measurement unit 106 generates images of the distance measurement pixels S1 and S2 based on obtained pixel values, and calculates a correlation between the two images to obtain an image deviation amount. The lens control unit 107 moves the photographing lens 102 according to the image deviation amount obtained by the pupil-divided image phase difference distance measurement unit 106 to achieve an auto focus operation.

To perform photographing, first, an object image is exposed on the image pickup element 103 to read a signal from all the pixels of the image pickup element 103. The image signal read from the image pickup element 103 is subjected to A/D conversion at the A/D conversion unit 104 to enter the development processing unit 105. The development processing unit 105 discards pixel values read from the distance measurement pixels S1 and S2, and generates pixel values corresponding to the distance measurement pixels S1 and S2 from surrounding pixels instead, to thereby perform interpolation processing. The development processing unit 105 performs development processing for image data by generating a luminance and color difference signal. Then, the compression processing unit 115 compresses the image data to store the compressed image data in the image data storing unit 116.

As described above, according to the embodiment of the present invention, the distance measurement pixels S1 and S2 include no color filter. Thus, no photographed image data can be used, but a pixel value of this portion is subjected to interpolation by using the surrounding pixels.

Interpolation processing during static image photographing may be carried out after the image data based on the image signal is fetched into the memory (e.g., image data storing unit 116). Interpolation processing during moving image photographing or in an electronic viewfinder is carried out by thinning out lines on the image pickup element 103 to prevent processing delay because about 30 images are repeatedly read from the image pickup element 103 per second during such photographing.

Thus, reading of the lines including the distance measurement pixels S1 and S2 is completed. In the digital camera 100, for example, the pupil-divided image phase difference distance measurement unit 106 selects two specific lines from among the read lines, and calculates a defocus amount from a phase difference between the distance measurement pixels S1 and S2. The lens control unit 107 drives, based on the defocus amount obtained by the pupil-divided image phase difference distance measurement unit 106, the photographing lens 102 to complete the auto focus operation.

Thus, according to the embodiment of the present invention, an image signal of a pixel read during reading in the thinning mode includes no pixel signal of a distance measurement pixel, and a pixel signal including a number of pixels enough to generate a moving image can be read.

Figure 20A:
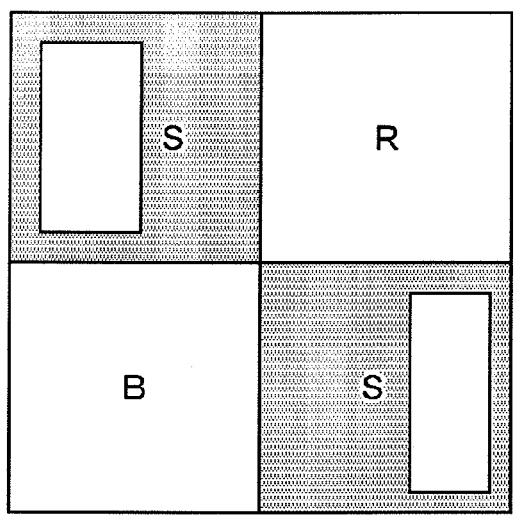
FIGS. 20A and 20B are schematic diagrams each illustrating an example of a distance measurement pixel of the image pickup element according to the embodiment of the present invention.
Figure 20B:
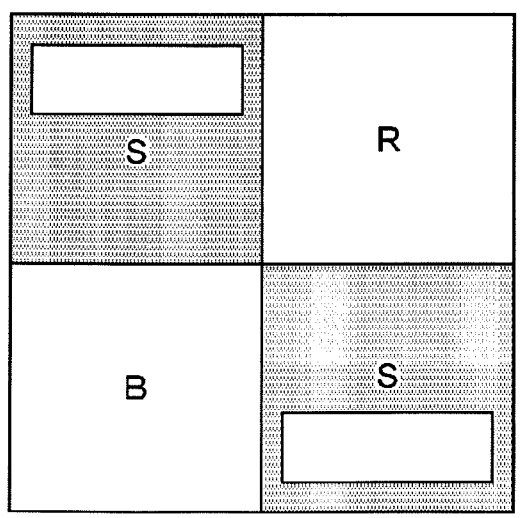

For example, dividing the pupil orthogonally to horizontal and vertical directions of the image pickup element 103 enables improvement of in-focus accuracy by detecting phase differences in both horizontal and vertical directions. Referring to FIGS. 20A and 20B, this arrangement is described below.

FIGS. 20A and 20B are schematic diagrams each illustrating an example of a distance measurement pixel of the image pickup element 103 according to the embodiment of the present invention. FIG. 20A illustrates a distance measurement pixel (S) pupil-divided in the horizontal direction of the image pickup element 103. FIG. 20B illustrates a distance measurement pixel (S) pupil-divided in the vertical direction of the image pickup element 103.

Distance measurement pixels similar to those illustrated in FIGS. 20A and 20B are disposed at constant intervals all over in the image pickup element 103. Then, for example, about 1% of all the pixels of the image pickup element 103 is allocated to the distance measurement pixels. Vertical stripes of the object photographed in a normal position of the digital camera 100 are for detecting a phase difference (defocus amount) by the distance measurement pixel pupil-divided in the horizontal direction (lateral direction). Horizontal stripes of the object photographed in the normal position of the digital camera 100 are for detecting a phase difference (defocus amount) by the distance measurement pixel pupil-divided in the vertical direction (longitudinal direction). Focusing by using those phase differences (defocus amounts) enables highly accurate setting of an in-focus state.

Object distance distribution of an image photographed within an angle of view is obtained for each area by such a distance measurement system as described above. This is described below referring to the drawings.

FIG. 21 is a schematic diagram illustrating a status of strobe photographing of an object using the digital camera (image pickup apparatus) of the embodiment of the present invention.

A wall 2101 includes a wall-hung clock 2102. A first person 2103 stands before the wall 2101. A second person 2104 stands before the first person 2103 with respect to the wall 2101. In FIG. 21, body parts other than heads of the first and second persons 2103 and 2104 are simplified by straight lines. Photographing ranges 2105 and 2106 indicate angles of view. FIG. 21 illustrates only the photographing lens 102 and the image pickup element 103 of the digital camera 100. In the image pickup element 103, an object image formed through the photographing lens 102 is illustrated.

Figure 22:
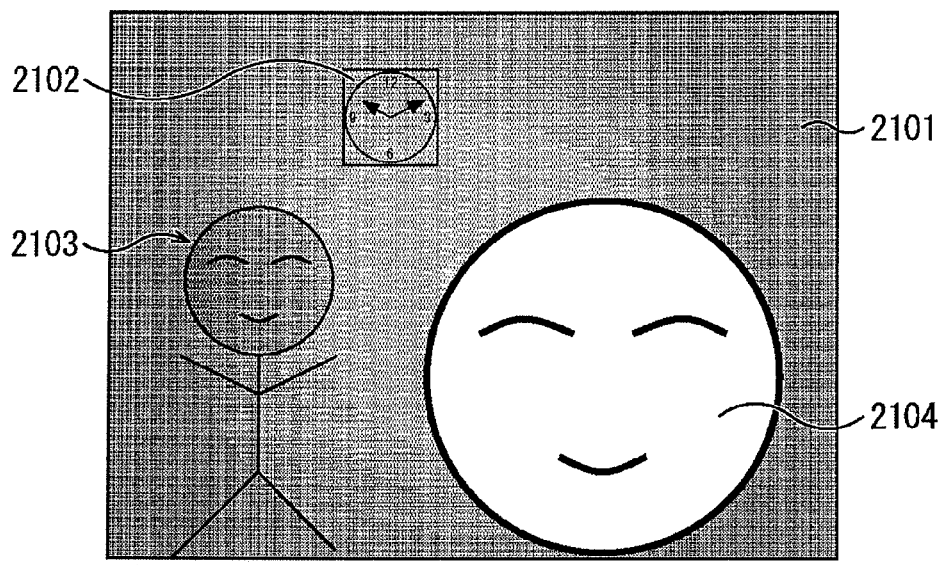
FIG. 22 is a schematic diagram illustrating an example of a photographed image when the strobe photographing of the object illustrated in FIG. 21 is carried out.

FIG. 22 is a schematic diagram illustrating an example of a photographed image when strobe photographing of the object illustrated in FIG. 21 is carried out. FIG. 22 illustrates an image photographed by the image pickup element 103 as an example. In FIG. 22, as in the case of FIG. 21, body parts other than the head of the first person 2103 are simplified by the straight lines.

Figure 23:
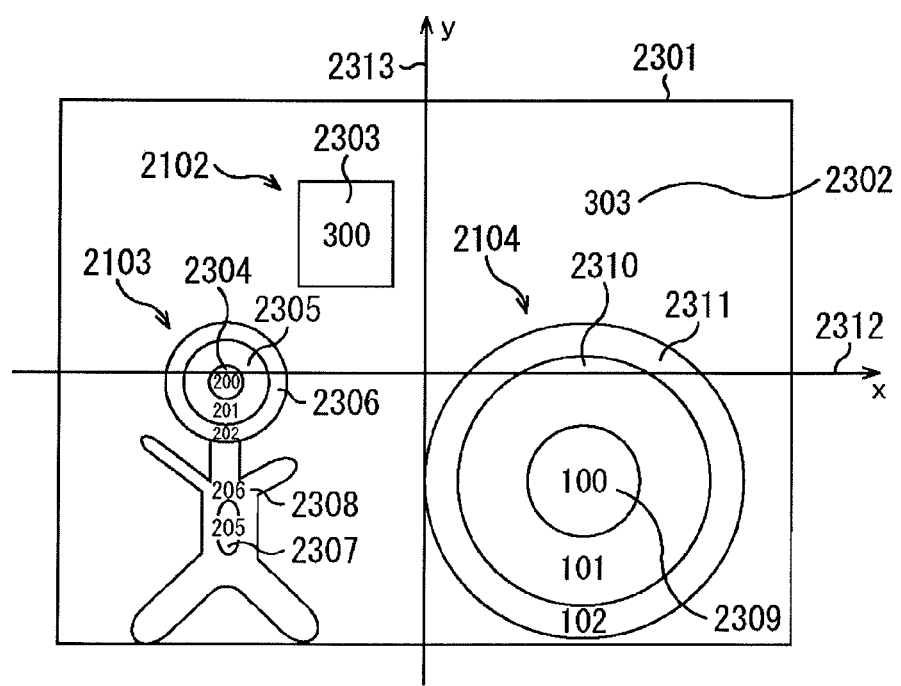
FIG. 23 is a schematic diagram illustrating an example of object distance distribution in the strobe photographing of the object illustrated in FIG. 21.

FIG. 23 is a schematic diagram illustrating an example of object distance distribution in the strobe photographing of the object illustrated in FIG. 21. An angle of view 2301 indicates an angle of view of the photographed image. The object distance distribution of FIG. 23 is obtained by the pupil-divided image phase difference distance measurement unit 106. In FIGS. 21 and 22, the body parts other than the head of the first person 2103 are illustrated in the simplified manner. In FIG. 23, however, the body parts are illustrated not in a simplified manner.

In FIG. 23, a distance 2302 indicates a distance to the wall 2101. In the example of FIG. 23, a distance from the digital camera 100 is 303 cm. A distance 2303 indicates a distance to the wall-hung clock 2102. In the example of FIG. 23, a distance from the digital camera 100 is 300 cm.

Distances 2304 to 2308 indicate distances to the first person 2103. In the example of FIG. 23, distances from the digital camera 100 to the first person 2103 have distance distribution of 200 cm to 206 cm. Distances 2309 to 2311 indicate distances to the second person 2104. In the example of FIG. 23, distances from the digital camera 100 to the second person 2104 have distance distribution of 100 cm to 102 cm. FIG. 23 illustrates an x axis 2312 indicating a horizontal position coordinate of the photographed image, and a y axis 2313 indicating a vertical position coordinate of the photographed image. Object distance distribution D of the object can be represented by D(x, y).

Description of Strobe Light Distribution Characteristics

Next, strobe light distribution characteristics of the embodiment of the present invention are described.

FIGS. 24A to 24E are schematic diagrams illustrating strobe light distribution characteristics.

Figure 24A:
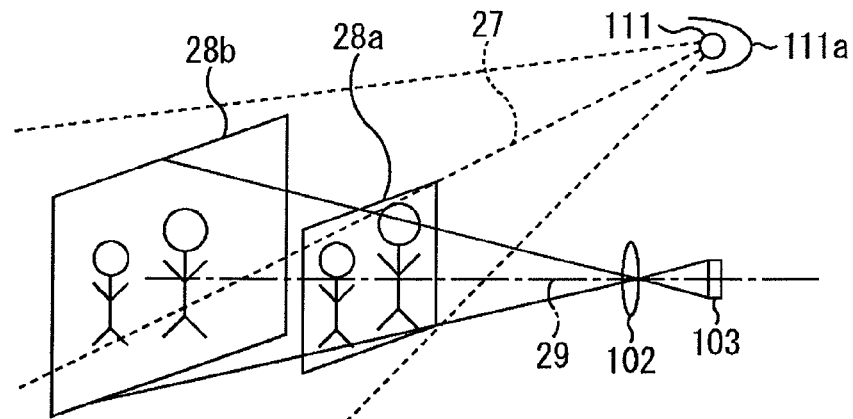
FIGS. 24A, 24B, 24C, 24D and 24E are schematic diagrams illustrating strobe light distribution characteristics.
Figure 24D:
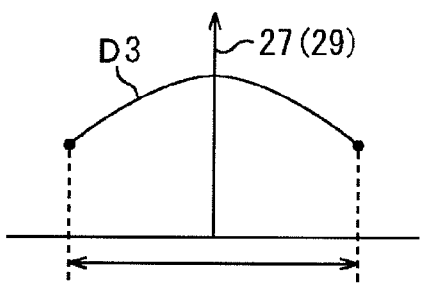
Figure 24B:
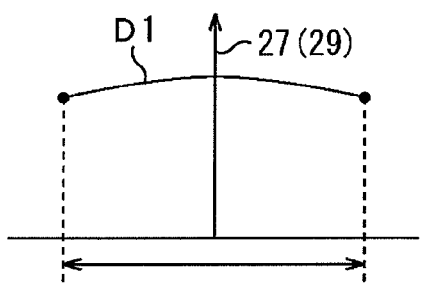
Figure 24E:
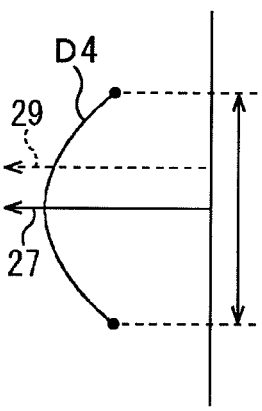
Figure 24C:
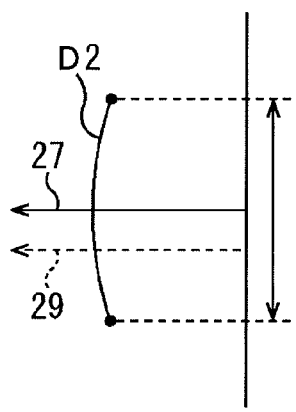

FIG. 24A is a perspective diagram schematically illustrating a relationship for far and near objects between light distribution of the strobe 111 and each of the photographing lens 102 and the image pickup element 103. FIG. 24B illustrates horizontal light distribution characteristics D1 of a flash of the strobe 111, for the near object. FIG. 24C illustrates vertical light distribution characteristics D2 of the flash of the strobe 111, for the near object. FIG. 24D illustrates horizontal light distribution characteristics D3 of a flash of the strobe 111, for the far object. FIG. 24E illustrates vertical light distribution characteristics D4 of the flash of the strobe 111, for the far object.

Specifically, FIGS. 24B and 24D illustrate light distribution characteristics in a range from a vertical surface including an intersection point between a center axis 27 of light distribution of the strobe 111 illustrated in FIG. 24A and a near object surface 28a or a far object surface 28b, to a left-and-right direction. FIGS. 24C and 24E illustrate light distribution characteristics in a range from a horizontal surface including the intersection point between the center axis 27 of the light distribution of the strobe 111 illustrated in FIG. 24A and the near object surface 28a or the far object surface 28b, to an up-and-down direction.

Thus, the vertical surface including the intersection point between the center axis 27 of light distribution and the object surface illustrated in FIGS. 24B and 24D of light distribution characteristics based on a flash hat 111a matches a lens axis 29 of the photographing lens 102 (when the strobe 111 is directly above the photographing lens 102).

However, the horizontal surface including the intersection point between the center axis 27 of light distribution and the object surface illustrated in FIGS. 24C and 24E deviates upward from the near object surface 28a and downward from the far object surface 28b as illustrated in FIG. 24A.

In this case, it is presumed that arrangement of the strobe 111 is laid out so that an optical axis of light distribution of the strobe 111 and an optical axis of the photographing lens 102 can match each other in a horizontal direction (camera left-and-right direction) and deviate from each other in a vertical direction (camera up-and-down direction). It is also presumed that the optical axis of light distribution of the strobe 111 is tilted so that the optical axis of light distribution of the strobe 111 and the optical axis of the photographing lens 102 can intersect each other in the vertical direction at a predetermined distance. In other words, with respect to the lens axis 29 of the photographing lens 102, i.e., a center of the image pickup element 103, the light distribution characteristics D2 move upward as illustrated in FIG. 24C in the case of the near object, and the light distribution characteristics D4 move downward as illustrated in FIG. 24E in the case of the far object. This processing enables obtaining of highly accurate strobe light distribution characteristics which take into consideration parallax caused by a positional difference between the photographing lens 102 as a camera main lens and the strobe 111.

Figure 25A:
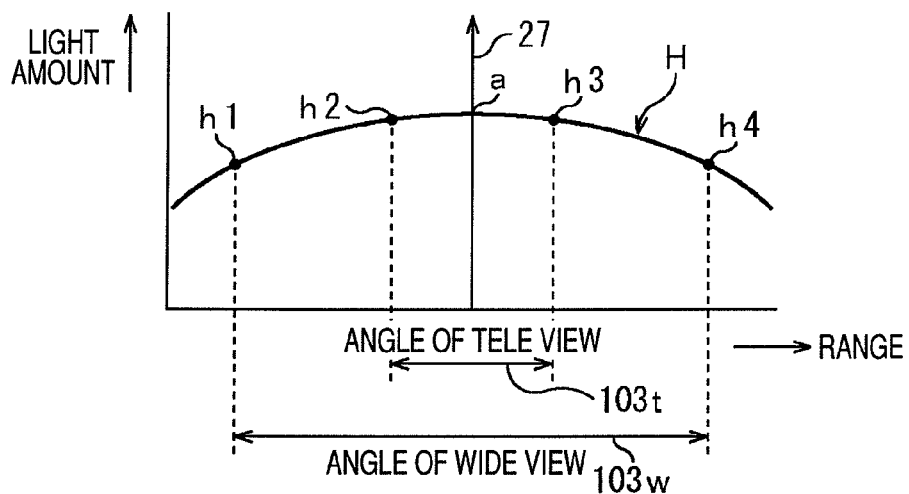
FIGS. 25A and 25B are schematic diagrams each illustrating an example of strobe light distribution characteristics based on a zoom position.
Figure 25B:
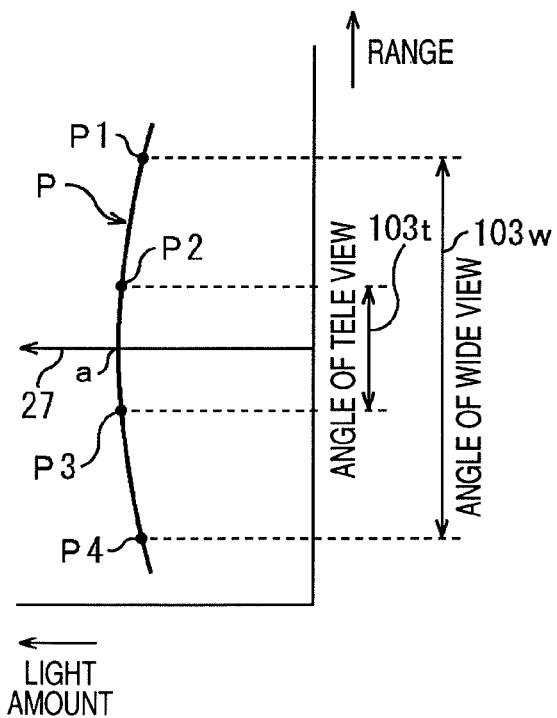

FIGS. 25A and 25B are schematic diagrams each illustrating an example of strobe light distribution characteristics based on a zoom position. FIG. 25A illustrates horizontal strobe light distribution characteristics based on the zoom position. FIG. 25B illustrates vertical strobe light distribution characteristics based on the zoom position.

In FIG. 25A, an ordinate indicates a light amount of light distribution of the strobe 111, while an abscissa indicates a light spread range around the center axis 27 of light distribution of the strobe 111. Light distribution characteristics H illustrated in FIG. 25A show a degree of light amount attenuation around a horizontal direction with a light amount a of the center axis 27 of light distribution being set to 100%.

In the degree of light amount attenuation of the horizontal direction illustrated in FIG. 25A, as indicated by the light distribution characteristics H, during photographing at a wide end, a light amount is attenuated along a curve from a center position of the light amount a to h1 in a left direction and to h4 in a right direction as illustrated in FIG. 25A. This attenuated light amount is reflected on brightness of an object image formed on an image pickup element 103w. During photographing at a tele end, a light amount is attenuated along a curve from the center position of the light amount a to h2 in the left direction and to h3 in the right direction as illustrated in FIG. 25A. This attenuated light amount is reflected on brightness of an object image formed on an image pickup element 103t.

In FIG. 25B, an abscissa indicates a light amount of light distribution of the strobe 111, while an ordinate indicates a light spread range around the center axis 27 of light distribution of the strobe 111. Light distribution characteristics P illustrated in FIG. 25B show a degree of light amount attenuation around a vertical direction with a light amount a of the center axis 27 of light distribution being set to 100%. Now, consideration is given to a case where the optical axis of the photographing lens 102 matches the centers of the image pickup element 103 and the object surface. In this case, when a center light amount of an object image formed on the image pickup element 103 is 100%, light amounts received by individual pixels arrayed from the center of the object image in the vertical direction on the image pickup element 103 can be calculated.

In the degree of light amount attenuation of the vertical direction illustrated in FIG. 25B, as indicated by the light distribution characteristics P, during photographing at the wide end, a light amount is attenuated along a curve from the center position of the light amount a to p1 in an upper direction and to p4 in a lower direction as illustrated in FIG. 25B. This attenuated light amount is reflected on brightness of an object image formed on the image pickup element 103w. During photographing at the tele end, a light amount is attenuated along a curve from the center position of the light amount a to p2 in the upper direction and to p3 in the lower direction as illustrated in FIG. 25B. This attenuated light amount is reflected on brightness of an object image formed on the image pickup element 103t.

An attenuation amount of a light amount of a middle portion between the horizontal and vertical directions is obtained as data of a curve connecting the light distribution characteristics H and P. FIGS. 25A and 25B illustrate the degrees of light amount attenuation in association with the spread ranges of light distribution characteristics, and thus sizes of the image pickup elements 103w and 103t are different from each other. Actually, however, the image pickup elements 103w and 103t indicate the same image pickup element 103.

The light distribution characteristics of the strobe 111 based on the object distance or the zoom position as described above are arranged into a table as correction data (strobe light distribution characteristic data) corresponding to a position of each pixel of the image pickup element 103, and stored beforehand in, for example, the strobe light distribution characteristic storing unit 112. Thus, according to the embodiment of the present invention, the strobe light distribution characteristic data stored in the strobe light distribution characteristic storing unit 112 contains a zoom position of the photographing lens 102. The strobe light distribution characteristic storing unit 112 is, for example, a nonvolatile memory such as a flash memory, and the strobe light distribution characteristic data is stored beforehand in this predetermined area.

The strobe light distribution characteristic data is represented by SY(D, Z, x, y), where D is an object distance, Z is a zoom position of the photographing lens 102, x is a horizontal coordinate, and y is a vertical coordinate. In this case, in view of a memory capacity of the strobe light distribution characteristic storing unit 112, when arrangement of strobe light distribution characteristic data SY of all D, Z, x and y into a table is difficult, for example, the following can be implemented. Specifically, a method may be employed, which stores strobe light distribution characteristic data SY of discrete D, Z, x and y in a table, and obtains actual strobe light distribution characteristics SY from a nearest value among discrete D, Z, x and y by interpolation processing. For the interpolation processing in this case, a bilinear method or a bicubic method may be used.

Description of Interpolation Processing

Next, interpolation processing carried out by the correction unit 113 is described.

First, interpolation processing when an in-focus state is not taken into consideration is described.

Figure 26:
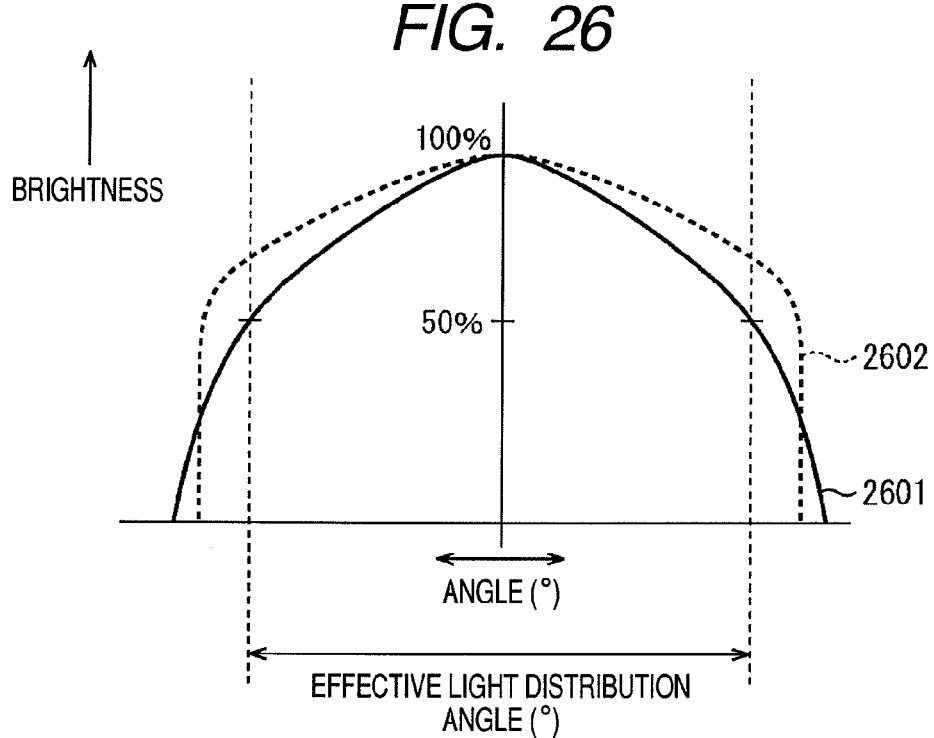
FIG. 26 is a schematic diagram illustrating an example of strobe light distribution characteristics.

FIG. 26 is a schematic diagram illustrating an example of strobe light distribution characteristics.

In FIG. 26, strobe light distribution characteristics 2601 and 2602 indicate fixed-direction strobe light distribution characteristics SY of a certain object distance D, a zoom position Z, and a coordinate (x, y). In other words, light distribution of the strobe 111 is bright at the center of an angle of view, and is dark at the periphery because of insufficient illumination.

Figure 27:
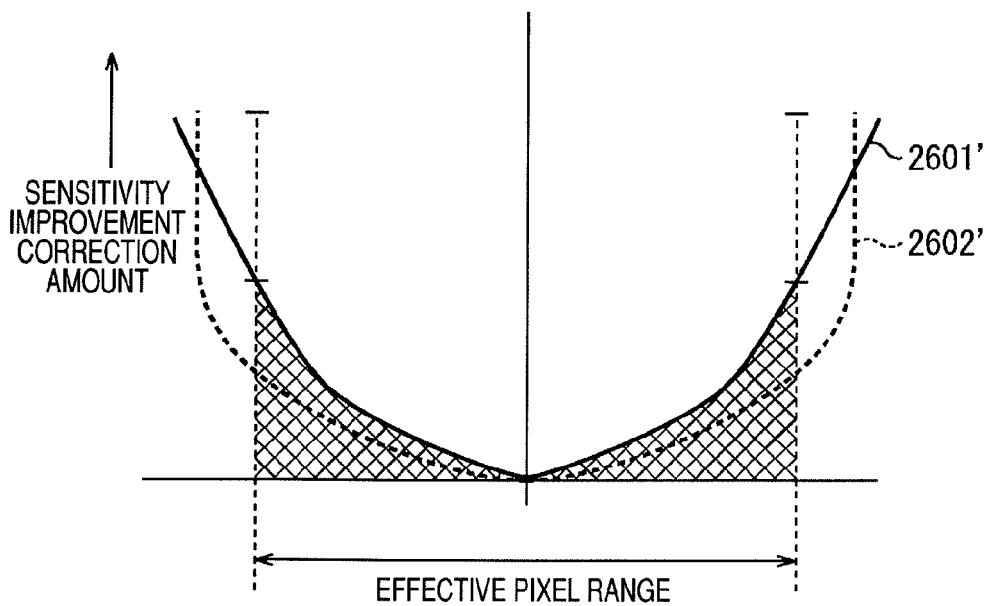
FIG. 27 is a schematic diagram illustrating an example of a correction gain in the case of the strobe light distribution characteristics illustrated in FIG. 26.

FIG. 27 is a schematic diagram illustrating an example of a correction gain in the case of the strobe light distribution characteristics illustrated in FIG. 26. In FIG. 27, a correction gain 2601' is for the strobe light distribution characteristics 2601 of FIG. 26, and a correction gain 2602' is for the strobe light distribution characteristics 2602 of FIG. 26. A correction gain for correction to appropriate brightness can be represented by G(D, Z, x, y). In this case, for example, the correction gain G(D, Z, x, y) can be defined as an inverse number of the strobe light distribution characteristics SY(D, Z, x, y). Only the correction gain of one direction is illustrated here. However, actual correction processing is carried out for a two-dimensional image area by the correction gain G(D, Z, x, y).

Next, correction processing when object distance distribution in the photographed image is taken into consideration is described.

For example, when photographing accompanied by light emission of the strobe 111 is carried out in a picture composition illustrated in FIG. 21, an image similar to that illustrated in FIG. 22 is photographed. In this case, the second person 2104 near the digital camera 100 is bright, the first person 2103 away from the digital camera 100 is darker than the second person 2104, and the wall 2101 and the clock 2102 more away therefrom are even darker. The object becomes darker from the center to the peripheral portion thereof.

In the case of such photographing as described above, an object distance D varies from one coordinate (x, y) to another in the photographed image. In this case, object distance distribution D(x, y) obtained from the pupil-divided image phase difference distance measurement unit 106 becomes as illustrated in FIG. 23 as described above. The correction gain calculation unit 113a obtains, using the object distance distribution D(x, y), strobe light distribution characteristics SY(D(x, y), Z, x, y) for each object distance from the strobe light distribution characteristics SY(D, Z, x, y) stored in the strobe light distribution characteristic storing unit 112. Then, the correction gain calculation unit 113a calculates a correction gain G(D(x, y), Z, x, y) based on the obtained strobe light distribution characteristics.

Figure 28:
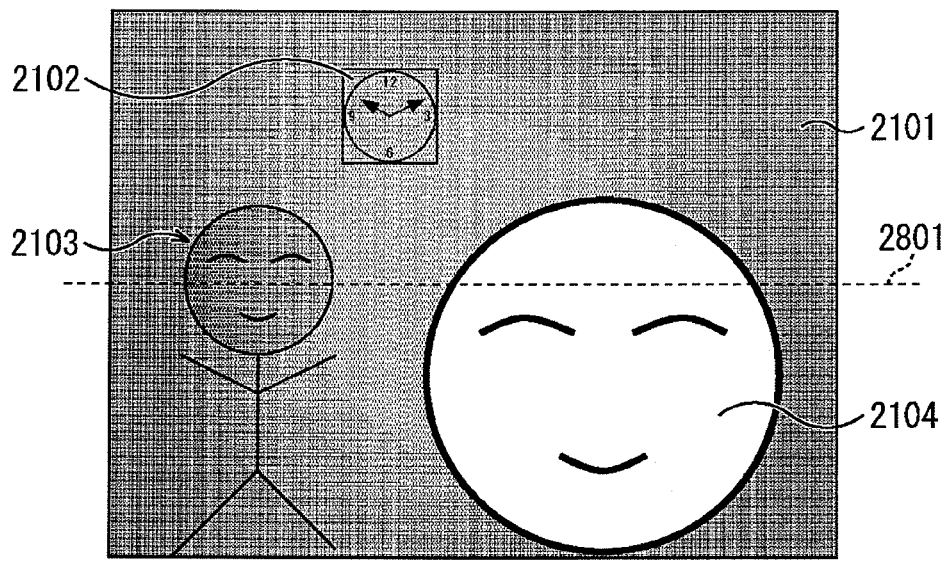
FIG. 28 is a schematic diagram illustrating an example of a photographed image when photographing of the object illustrated in FIG. 21 is carried out.

FIG. 28 is a schematic diagram illustrating an example of a photographed image when the object illustrated in FIG. 21 is photographed. FIG. 28 is based on the photographed image illustrated in FIG. 22, and illustrates a horizontal image portion 2801 of the photographed image.

Figure 29:
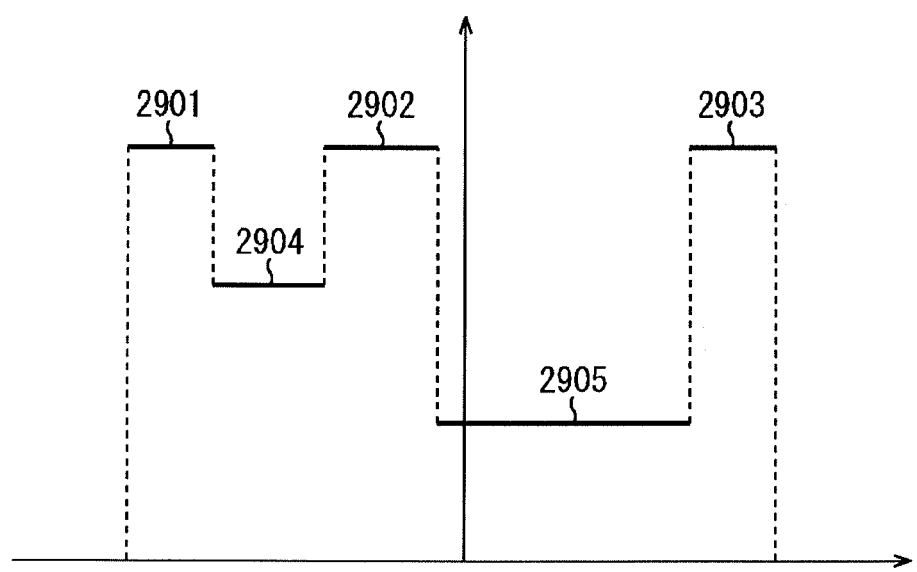
FIG. 29 is a schematic diagram illustrating an example of object distance distribution of a horizontal image portion illustrated in FIG. 28.

FIG. 29 is a schematic diagram illustrating an example of object distance distribution of the horizontal image portion 2801 illustrated in FIG. 28. FIG. 29 illustrates object distance distribution D(x, y) for an x coordinate of an abscissa of the horizontal image portion 2801 illustrated in FIG. 28.

In FIG. 29, object distance distributions 2901 to 2903 indicate distance distributions of the wall 2101 from the digital camera 100. Object distance distribution 2904 indicates distance distribution of the first person 2103 from the digital camera 100, and object distance distribution 2905 indicates distance distribution of the second person 2104 from the digital camera 100.

Figure 30:
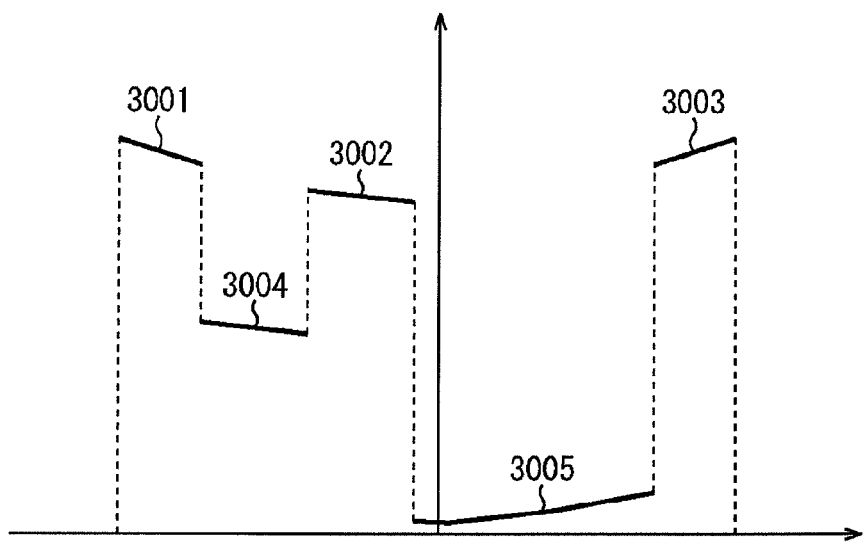
FIG. 30 is a schematic diagram illustrating an example of a correction gain in the horizontal image portion illustrated in FIG. 28.

FIG. 30 is a schematic diagram illustrating an example of a correction gain in the horizontal image portion 2801 illustrated in FIG. 28. The correction gain illustrated in FIG. 30 is a correction gain G(D(x, y), Z, x, y) obtained from the strobe light distribution characteristics SY(D(x, y), Z, x, y) and the object distance distribution D(x, y) illustrated in FIG. 29.

Correction gains 3001 to 3003 indicate correction gains applied to the horizontal image portion 2801 of the wall 2101. A correction gain 3004 indicates a correction gain applied to the horizontal image portion 2801 of the first person 2103, and a correction gain 3005 is a correction gain applied to the horizontal image portion 2801 of the second person 2104. Correction processing of the correction processing unit 113b is carried out by multiplying image data of the horizontal image portion 2801 by each correction gain G(D(x, y), Z, x, y) illustrated in FIG. 30 according to an x coordinate of the horizontal image portion 2801 of the photographed image illustrated in FIG. 28. Similarly, in the correction processing of the correction processing unit 113b, a correction gain G(D(x, y), Z, x, y) of each pixel is obtained for a two-dimensional photographed image (x, y), and a corrected image (x, y) is obtained by multiplying a corresponding photographed image by the correction gain G(D(x, y), Z, x, y).

Figure 31:
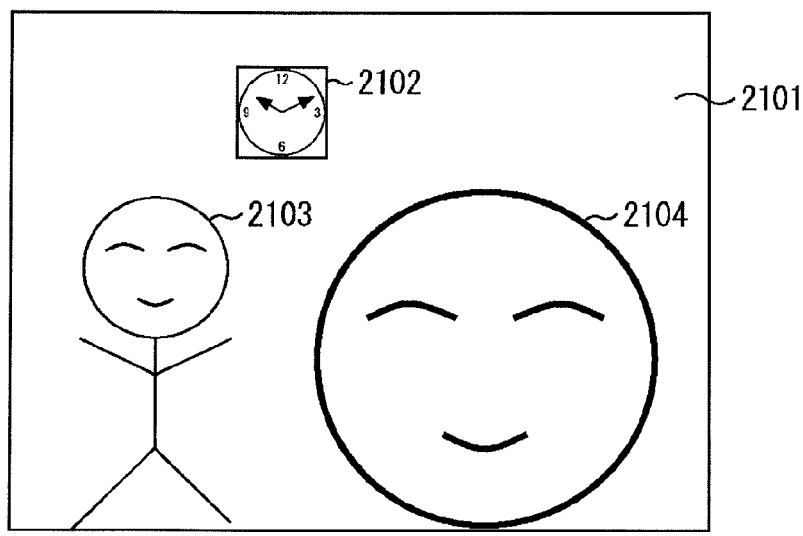
FIG. 31 is a schematic diagram illustrating an example of a photographed image after correction processing performed for the photographed image illustrated in FIG. 22.

FIG. 31 is a schematic diagram illustrating an example of a photographed image after correction processing of the photographed image illustrated in FIG. 22.

As described above, performing correction processing by using the correction gain G based on the object distance distribution D enables, even in the case of an object having nonuniform distance distribution as illustrated in FIG. 23 with the picture composition illustrated in FIG. 21, obtaining of a uniformly and appropriately bright photographed image similar to that illustrated in FIG. 31.

Next, correction processing when an in-focus state is taken into consideration is described.

The correction gain calculation unit 113a can obtain a degree of in-focus FL(Z, F, A, D) from zoom position information Z and focus position information F obtained from the lens control unit 107 and iris value information A obtained from the exposure control unit 108. In this case, a depth of object Df(Z, F, A, D1) determined to be in an in-focus state at a certain degree of in-focus $FL_0$ or more is obtained. D denotes an object distance, and D1 denotes an in-focus object distance.

Figure 32:
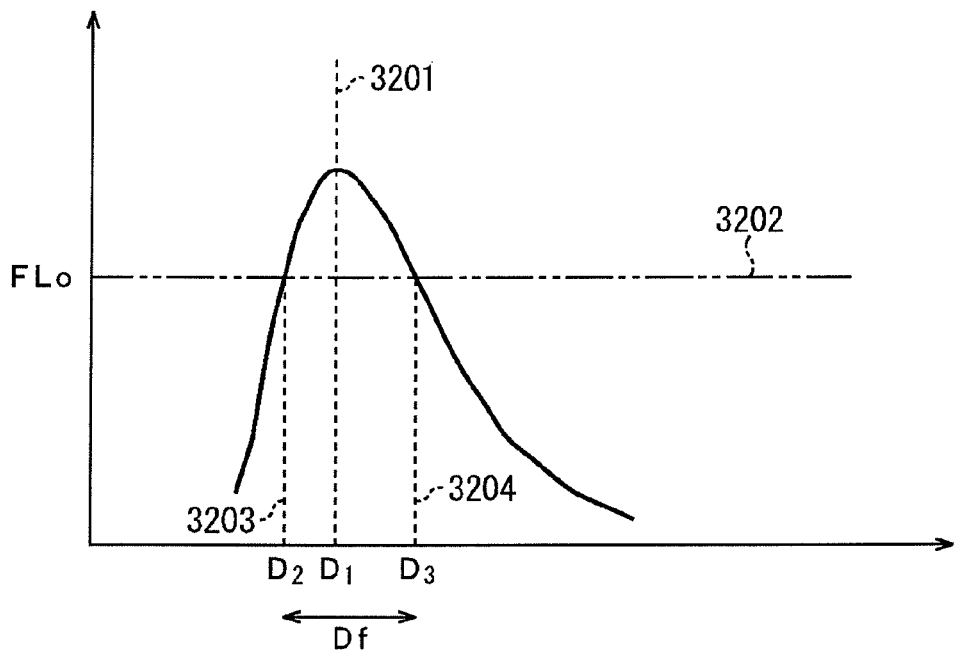
FIG. 32 is a schematic diagram illustrating an example of a degree of in-focus when an iris aperture is wide.
Figure 33:
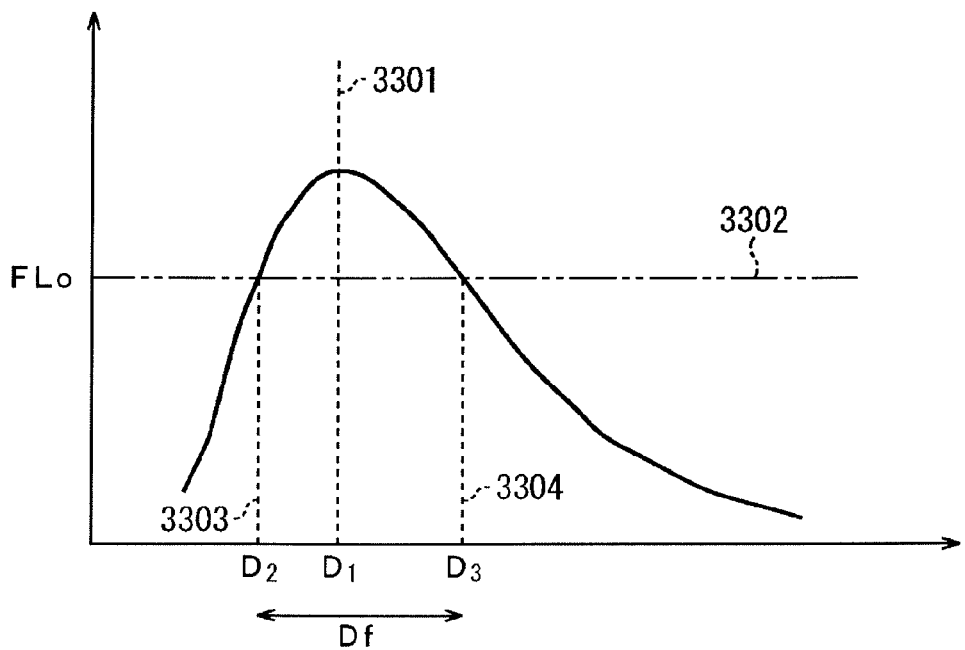
FIG. 33 is a schematic diagram illustrating an example of a degree of in-focus when the iris aperture is narrow.

FIGS. 32 and 33 are schematic diagrams each illustrating an example of a degree of in-focus FL(Z, F A, D). FIG. 32 illustrates an open state of the iris 101 as compared with the case of FIG. 33. In FIGS. 32 and 33, $FL_0$ 3202 and 3302 indicate degrees of in-focus at which determination of an in-focus state is enabled, and D1 (3201, 3301) indicates an in-focus object distance.

In this case, D2 (3203, 3303) indicates an in-focus limitation of a front side, D3 (3204, 3304) indicates an in-focus limitation of a rear side, and a range of from D2 (3203, 3303) to D3 (3204, 3304) indicates a depth of object Df to enable determination of an in-focus state. In the case of FIG. 32, the depth of object Df is lower because the iris 101 is open as compared with that of FIG. 33.

A degree of in-focus FL(Z, F, A, D(x, y)) can be obtained for a coordinate (x, y) of the photographed image from the degree of in-focus FL(Z, F, A, D) and the object distance distribution D(x, y) described above.

Figure 34:
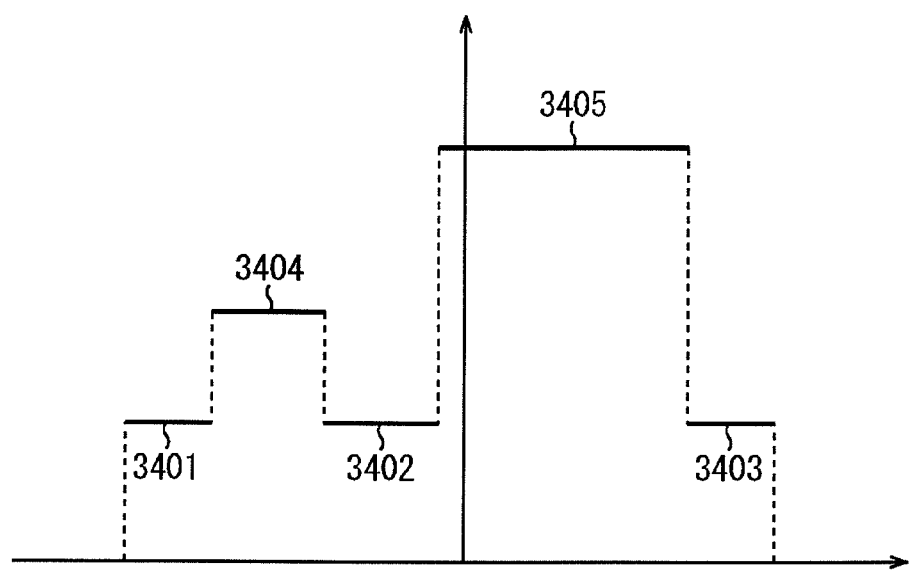
FIG. 34 is a schematic diagram illustrating an example of a degree of in-focus for the horizontal image portion illustrated in FIG. 28.

FIG. 34 is a schematic diagram illustrating an example of a degree of in-focus FL(Z, F, A, D(x, y)) for the horizontal image portion 2801 illustrated in FIG. 28. It is presumed here that the camera is focused on the first person 2103 illustrated in FIG. 21.

Degrees of in-focus 3401 to 3403 indicate degrees of in-focus FL(Z, F, A, D(x, y)) of the wall 2101. A degree of in-focus 3404 indicates a degree of in-focus FL(Z, F, A, D(x, y)) of the first person 2103, and a degree of in-focus 3405 indicates a degree of in-focus FL(Z, F, A, D(x, y)) of the second person 2104.

Executing processing similar to the above enables obtaining of a degree of in-focus FL(Z, F, A, D(x, y)) of the photographed image (x, y). Whether or not object distance distribution D(x, y) is within the depth of object Df to enable determination of an in-focus state can be determined. In other words, an in-focus state can be discriminated from other states.

Correction processing with consideration given to object distance distribution D(x, y) and a degree of in-focus FL(Z, F, A, D(x, y)) is described.

Figure 35:
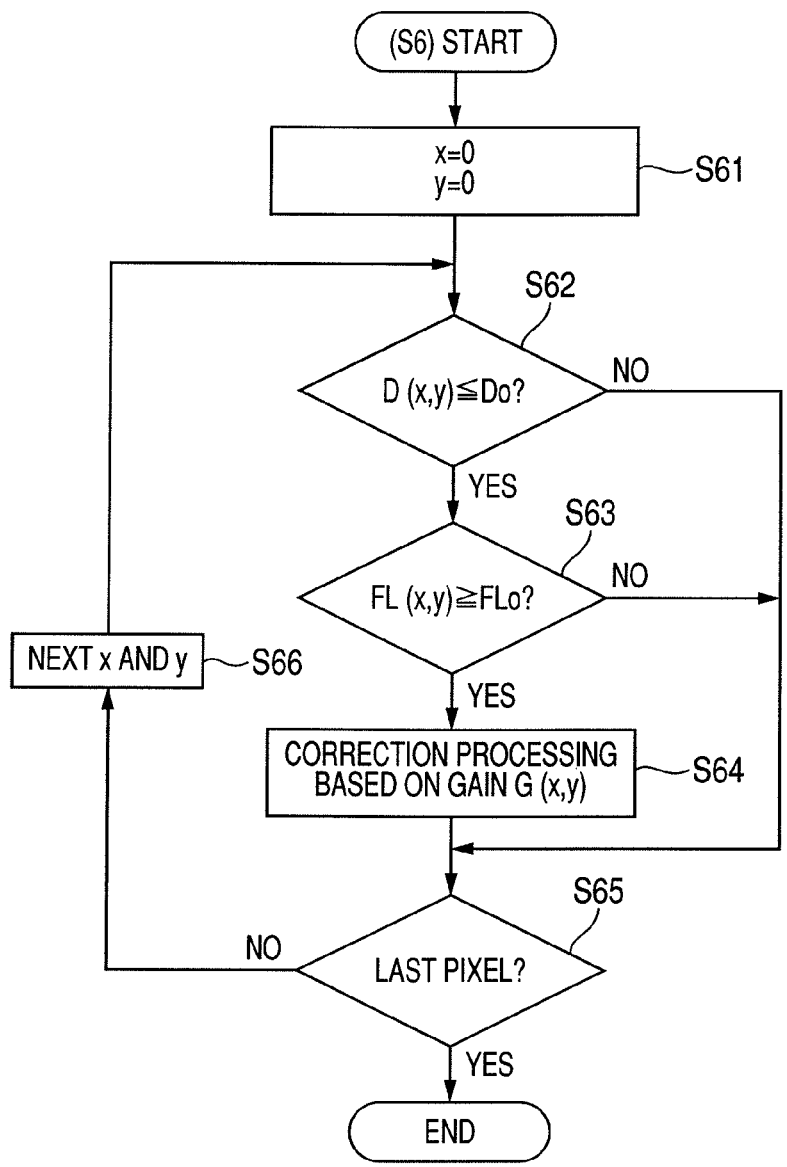
FIG. 35 is a flowchart illustrating an example of a detailed processing procedure in image correction processing of Step S6 illustrated in FIG. 2.

FIG. 35 is a flowchart illustrating an example of a detailed processing procedure in the image correction processing of Step S6 illustrated in FIG. 2.

First, in Step S61, the correction processing unit 113b initializes values of x and y of a coordinate (x, y) to 0.

In Step S62, the correction processing unit 113b determines whether or not an object distance D(x, y) of the coordinate (x, y) is equal to or less than a predetermined distance $D_0$. In other words, in Step S62, the correction processing unit 113b determines whether or not the object distance D(x, y) of the coordinate (x, y) is equal to or less than a predetermined threshold value. If a result of the determination shows that the object distance D(x, y) is not equal to or less than the distance $D_0$, in other words, larger than the distance $D_0$, the process proceeds to Step S65 without executing correction processing for a pixel of the coordinate (x, y) of the photographed image.

On the other hand, if a result of the determination in Step S62 illustrates that the object distance D(x, y) is equal to or less than the distance $D_0$, the process proceeds to Step S63. In Step S63, the correction processing unit 113b determines whether or not a degree of in-focus FL(Z, F, A, D(x, y)) of the coordinate (x, y) is equal to or more than $FL_0$ to enable determination of an in-focus state. In other words, in Step S63, the correction processing unit 113b determines whether or not the degree of in-focus FL(Z, F, A, D(x, y)) of the coordinate (x, y) is equal to or more than a predetermined threshold value. If a result of the determination illustrates that the degree of in-focus FL(Z, F, A, D(x, y)) of the coordinate (x, y) is not equal to or more than $FL_0$ (in other words, it is less than $FL_0$), determining that an in-focus state has not been set, the correction processing unit 113b proceeds to Step S65 without executing correction processing for the pixel of the coordinate (x, y) of the photographed image.

If a result of the determination in Step S63 illustrates that the degree of in-focus FL(Z, F, A, D(x, y)) of the coordinate (x, y) is equal to or more than $FL_0$, determining that an in-focus state has been set, the correction processing unit 113b proceeds to Step S64. In Step S64, the correction processing unit 113b carries out correction processing based on the correction gain G(D(x, y), Z, x, y) obtained in Step S5 of FIG. 2 for the pixel of the coordinate (x, y) of the photographed image.

In Step S65, the correction processing unit 113b determines whether or not the coordinate (x, y) is a last pixel of the photographed image. If a result of the determination illustrates that the coordinate (x, y) is not a last pixel of the photographed image, the correction processing unit 113b proceeds to Step S66. In Step S66, the correction processing unit 113b sets values of x and y of a next coordinate (x, y) to return to Step S62. Then, until processing of a last pixel of the photographed image, the correction processing unit 113b repeats Steps S62 to S66.

On the other hand, if a result of the determination in Step S65 illustrates that the coordinate (x, y) is a last pixel of the photographed image, the processing of the flowchart (image correction processing illustrated in FIG. 2) is finished.

Figure 36:
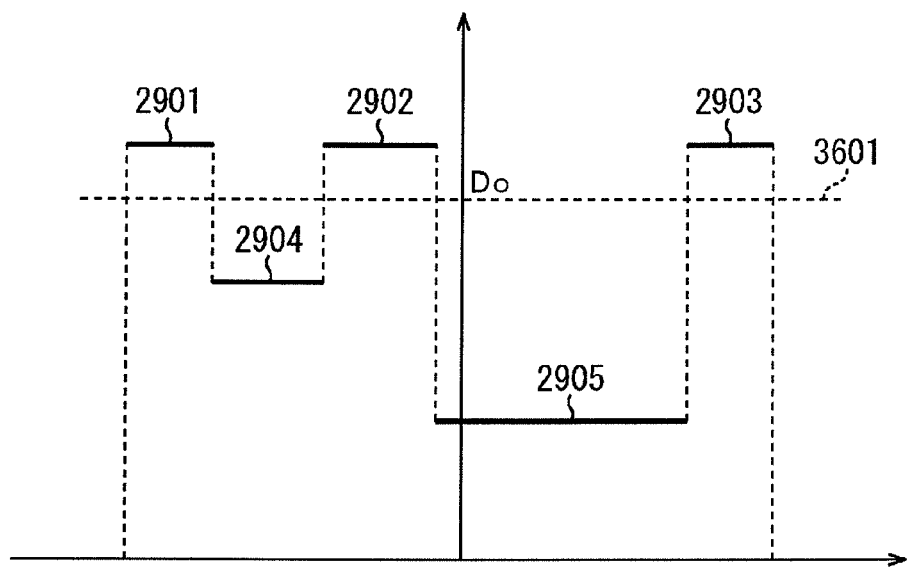
FIG. 36 is a schematic diagram illustrating an example of object distance distribution in the horizontal image portion illustrated in FIG. 28.

FIG. 36 is a schematic diagram illustrating an example of object distance distribution of the horizontal image portion 2801 illustrated in FIG. 28. FIG. 36 illustrates object distance distribution D(x, y) for an x axis of an abscissa of the horizontal image portion 2801 illustrated in FIG. 28. In FIG. 36, components similar to those of FIG. 29 are denoted by similar reference numerals.

In the object distance distribution D(x, y) illustrated in FIG. 36, for example, when the above-mentioned distance $D_0$ is a distance 3601, distances of the wall 2101 are larger than the distance $D_0$ (distance 3601) up to the object distance distributions 2901 to 2903. Thus, corresponding pixels are not targets of correction processing. On the other hand, the object distance distribution 2904 of the first person 2103 and the object distance distribution 2905 of the second person 2104 are equal to or less than the distance $D_0$ (distance 3601). Thus, corresponding pixels are targets of correction processing.

As illustrated in Step S62 of FIG. 35, by targeting only pixels in which object distance distribution D(x, y) is equal to or less than $D_0$ for correction, for example, only strobe light distribution to a nearest person during photographing in a night view mode can be corrected, and background buildings can be set outside targets of correction.

Figure 37:
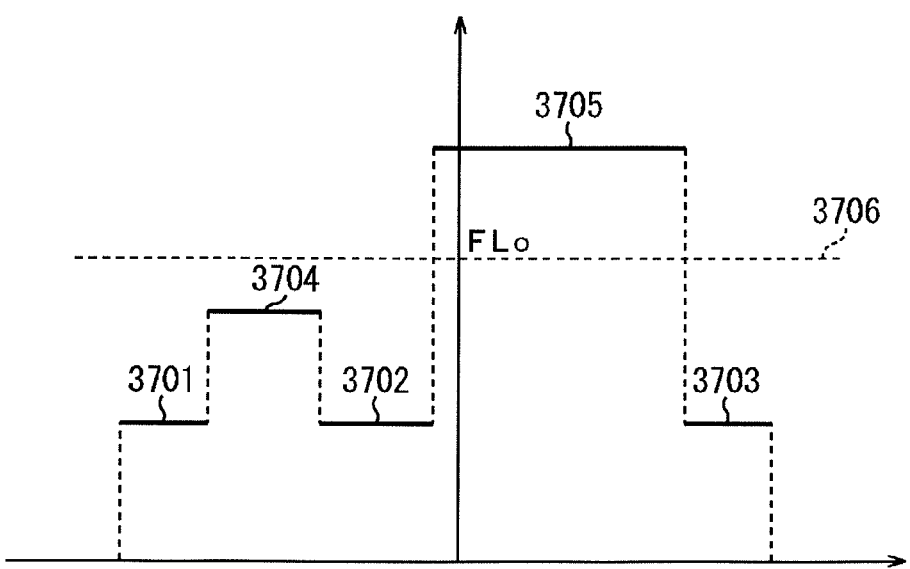
FIG. 37 is a schematic diagram illustrating an example of a degree of in-focus in the horizontal image portion illustrated in FIG. 28.

FIG. 37 is a schematic diagram illustrating an example of a degree of in-focus FL(Z, F, A, D(x, y)) of the horizontal image portion 2801 illustrated in FIG. 28.

In FIG. 37, degrees of in-focus 3701 to 3703 indicate degrees of in-focus FL(Z, F, A, D(x, y)) of the wall 2101 in the horizontal image portion 2801. A degree of in-focus 3704 indicates a degree of in-focus FL(Z, F, A, D(x, y)) of the first person 2103 in the horizontal image portion 2801, and a degree of in-focus 3705 indicates a degree of in-focus FL(Z, F, A, D(x, y)) of the second person 2104 in the horizontal image portion 2801. It is presumed here, for example, that $FL_0$ to enable determination of an in-focus state is $FL_0$ (3706) illustrated in FIG. 37.

In this case, in Step S63, the degree of in-focus 3704 of the first person 2103 (similar for the degree of in-focus 3701 to 3703 of the wall 2101) is less than $FL_0$(3706). Thus, a corresponding pixel is not a target of correction processing. On the other hand, the degree of in-focus 3705 of the second person 2104 is equal to or more than $FL_0$(3706). Thus, a corresponding pixel is a target of correction processing.

Executing the processing of Step S63 enables execution of correction processing based on strobe light distribution characteristics only to an object of an in-focus state. Through this processing, a blurred object image area of an out-of-focus state of the photographed image is set outside a target of correction processing based on strobe light distribution characteristics, and only an object image area determined to be in an in-focus state can be subjected to correction processing.

Figure 38:
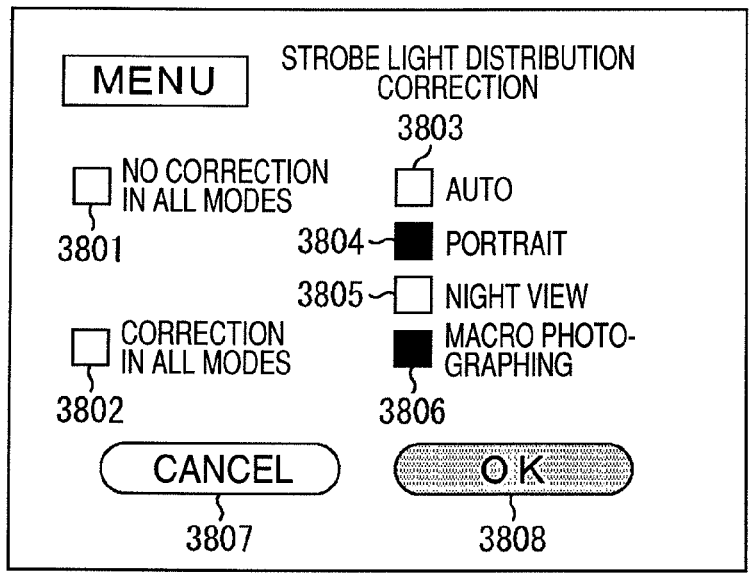
FIG. 38 is a schematic diagram illustrating an example of a menu setting screen regarding correction processing in strobe light distribution characteristics.
Figure 39:
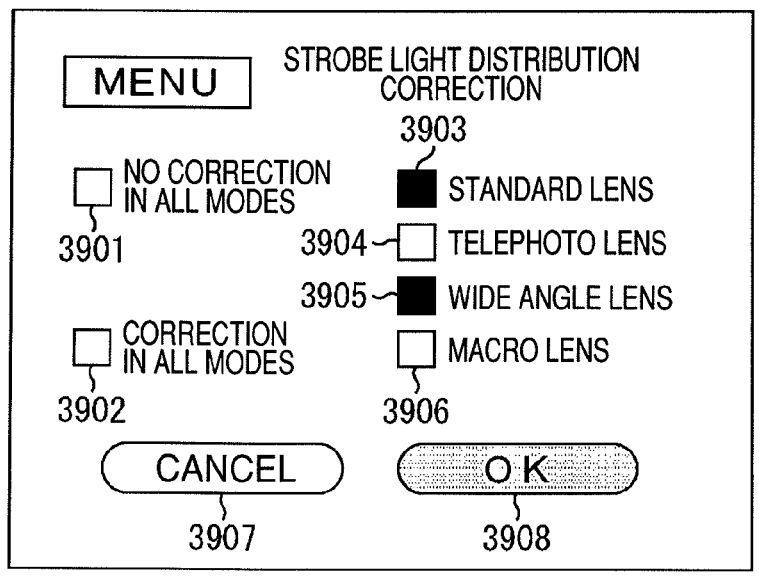
FIG. 39 is a schematic diagram illustrating an example of a menu setting screen regarding the correction processing in the strobe light distribution characteristics.

Next, a menu setting example regarding correction processing based on strobe light distribution characteristics is described. FIGS. 38 and 39 are schematic diagrams each illustrating an example of a menu setting screen regarding correction processing based on strobe light distribution characteristics. This menu setting screen is, for example, displayed on a display screen of the operation input unit 114 illustrated in FIG. 1 to receive an operation entry from an operator (user).

First, the menu setting screen of FIG. 38 is described.

FIG. 38 illustrates an example of a menu setting screen for setting whether to carry out correction processing based on strobe light distribution characteristics for each photographing mode. In other words, the digital camera 100 of this embodiment is configured so that the operator can specify whether to correct the photographed image for each photographing mode via the operation input unit 114.

When a button 3801 is selected, the correction unit 113 sets, for all the photographing modes, nonexecution of correction processing (no correction) based on strobe light distribution characteristics. When the button 3801 is selected, selections by other buttons are cleared.

When a button 3802 is selected, the correction unit 113 sets, for all the photographing modes, execution of correction processing (there is correction) based on strobe light distribution characteristics. When the button 3802 is selected, selections by other buttons are cleared.

Buttons 3803 to 3806 are for setting whether to carry out correction processing based on strobe light distribution characteristics, for each photographing mode enabling photographing in the digital camera 100. In this case, various photographing modes selected by the buttons 3803 to 3806 are separately set via the operation input unit 114 at, for example, the time of actual photographing.

Specifically, when the button 3803 is selected, the correction unit 113 sets execution of correction processing based on strobe light distribution characteristics when a photographing mode of the digital camera 100 is an auto photographing mode. When the button 3804 is selected, the correction unit 113 sets execution of correction processing based on strobe light distribution characteristics when a photographing mode of the digital camera 100 is a portrait photographing mode. When the button 3805 is selected, the correction unit 113 sets execution of correction processing based on strobe light distribution characteristics when a photographing mode of the digital camera 100 is a night view photographing mode. When the button 3806 is selected, the correction unit 113 sets execution of correction processing based on strobe light distribution characteristics when a photographing mode of the digital camera 100 is a macrophotographing mode. When one of the buttons 3803 to 3806 is selected in a selected state of the button 3801 or 3802, setting by the selected button 3801 or 3802 is cleared.

When a button 3807 is selected, the correction unit 113 cancels settings selected by the respective buttons (3801 to 3806). When a button 3808 is selected, based on a currently selected state, the correction unit 113 sets correction processing based on strobe light distribution characteristics. In this case, the correction unit 113 sets correction processing based on strobe light distribution characteristics by, for example, storing setting information set by the menu setting screen of FIG. 38 in its own internal memory (e.g., internal memory of the correction gain calculation unit 113*a*).

In the example of FIG. 38, the buttons 3804 and 3806 are selected. Accordingly, when settings are made, in the case where photographing modes of the digital camera 100 are a portrait photographing mode and a macrophotographing mode, correction processing based on strobe light distribution characteristics is carried out.

The menu setting screen of FIG. 39 is described below.

FIG. 39 illustrates an example of a menu setting screen for setting whether to carry out correction processing based on strobe light distribution characteristics for each type of a photographing lens 102. Setting by the menu setting screen of FIG. 39 is effective in the case of an image pickup apparatus in which a photographing lens is detachable or in the case of an image pickup apparatus in which a conversion lens is detachable. In other words, the digital camera 100 of this embodiment is configured so that the operator can designate whether to correct the photographed image for each type of the photographing lens 102 via the operation input unit 114.

When a button 3901 is selected, the correction unit 113 sets nonexecution of correction processing (no correction) based on strobe light distribution characteristics for all photographing lens types. When the button 3901 is selected, selections by other buttons are cleared.

When a button 3902 is selected, the correction unit 113 sets, for all the photographing lens types, execution of correction processing (there is correction) based on strobe light distribution characteristics. When the button 3902 is selected, selections by other buttons are cleared.

Buttons 3903 to 3906 are for setting whether to carry out correction processing based on strobe light distribution characteristics, for each type of a photographing lens 102 loaded on the digital camera 100. In this case, various types of photographing lenses 102 selected by the buttons 3903 to 3906 are separately set via the operation input unit 114 at, for example, the time of loading the photographing lenses 102 on the image pickup apparatus.

Specifically, when the button 3903 is selected, the correction unit 113 sets execution of correction processing based on strobe light distribution characteristics when a type of a photographing lens 102 is a standard lens. When the button 3904 is selected, the correction unit 113 sets execution of correction processing based on strobe light distribution characteristics when a type of a photographing lens 102 is a telescopic lens. When the button 3905 is selected, the correction unit 113 sets execution of correction processing based on strobe light distribution characteristics when a type of a photographing lens 102 is a wide-angle lens. When the button 3906 is selected, the correction unit 113 sets execution of correction processing based on strobe light distribution characteristics when a type of a photographing lens 102 is a macrolens. When one of the buttons 3903 to 3906 is selected in a selected state of the button 3901 or 3902, setting by the selected button 3901 or 3902 is cleared.

When a button 3907 is selected, the correction unit 113 cancels settings selected by the respective buttons (3901 to 3906). When a button 3908 is selected, based on a currently selected state, the correction unit 113 sets correction processing based on strobe light distribution characteristics. In this case, the correction unit 113 sets correction processing based on strobe light distribution characteristics by, for example, storing setting information set by the menu setting screen of FIG. 39 in its own internal memory (e.g., internal memory of the correction gain calculation unit 113*a*).

In the example of FIG. 39, the buttons 3903 and 3905 are selected. Accordingly, when settings are made, in the case where types of photographing lenses 102 are a standard type and a wide-angle type, correction processing based on strobe light distribution characteristics is carried out.

The photographing modes and the types of the photographing lenses 102 illustrated in FIGS. 38 and 39 are only examples. Other photographing modes and other types of photographing lenses 102 can be applied similarly to this embodiment described above. The menu setting screens are also only examples, and settings by other similar menu representations may be employed.

Figure 40:
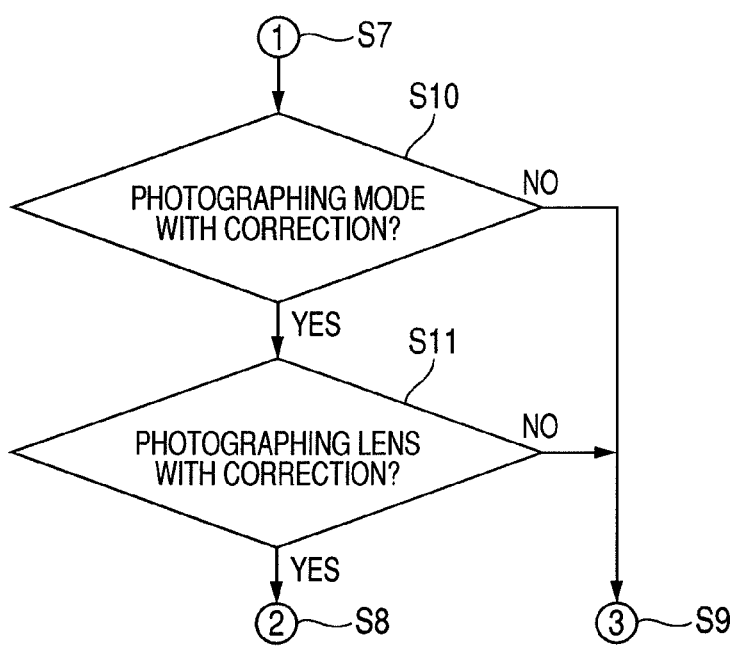
FIG. 40 is a flowchart illustrating an example of proceeding processing to the flowchart of FIG. 2 when various settings are made on the menu setting screens illustrated in FIGS. 38 and 39.

FIG. 40 is a flowchart illustrating an example of proceeding processing to the flowchart of FIG. 2 when various settings are made by the menu setting screens illustrated in FIGS. 38 and 39.

When there are settings made by the menu setting screens of FIGS. 38 and 39, after an end of Step S1 of FIG. 2, the process proceeds to Step S10 illustrated in FIG. 40. In Step S10, the correction unit 113 determines whether a current photographing mode of the digital camera 100 is a photographing mode, which is set on the menu setting screen of FIG. 38, for executing correction processing based on strobe light distribution characteristics. In this case, for example, the correction unit 113 makes the determination by reading setting information set on the menu setting screen of FIG. 38 and stored in its own internal memory.

If a result of the determination in Step S10 indicates that the current photographing mode of the digital camera 100 is not a photographing mode set in FIG. 38 to execute correction processing based on strobe light distribution characteristics, the correction unit 113 proceeds to Step S9 of FIG. 2 to finish the processing.

On the other hand, if a result of the determination in Step S10 indicates that the current photographing mode of the digital camera 100 is a photographing mode set in FIG. 38 to execute correction processing based on strobe light distribution characteristics, the correction unit 113 proceeds to Step S11.

In Step S11, the correction unit 113 determines whether a type of a photographing lens 102 currently loaded on the digital camera 100 is a photographing lens set in FIG. 39 to execute correction processing based on strobe light distribution characteristics. In this case, for example, the correction unit 113 makes the determination by reading setting information set on the menu setting screen of FIG. 39 and stored in its own internal memory.

If a result of the determination in Step S11 indicates that the type of the photographing lens 102 currently loaded on the digital camera 100 is not a photographing lens set in FIG. 39 to execute correction processing based on strobe light distribution characteristics, the correction unit 113 proceeds to Step S9 of FIG. 2 to finish the processing.

On the other hand, if a result of the determination in Step S11 indicates that the type of the photographing lens 102 currently loaded on the digital camera 100 is a photographing lens set in FIG. 39 to execute correction processing based on strobe light distribution characteristics, the correction unit 113 proceeds to Step S9 of FIG. 2. Then, in this case, processing to proceed to Step S2 of FIG. 2 is executed to carry out correction processing based on strobe light distribution characteristics.

This embodiment has been described by way of the example of the image pickup apparatus where the conversion lens can be loaded or the photographing lens 102 can be detachably loaded. In the case of an image pickup apparatus where a photographing lens 102 is fixed, setting regarding a type of a photographing lens illustrated in FIG. 39 is made unnecessary. In this case, processing in Step S11 of FIG. 40 is unnecessary.

According to this embodiment, a distance from the object is measured for each image area of the photographed image, and the measured distance is reflected to correct the photographed image. Thus, local radiation distribution unevenness caused by a strobe can be removed from an image photographed by using the strobe. In other words, this embodiment enables adaptive brightness correction even for a nonlinear image area of the photographed image.

The steps of FIGS. 2, 35, and 40 illustrating the control method of the digital camera (image pickup apparatus) 100 of this embodiment are realized by executing a program stored in a RAM or a ROM via a CPU of a computer. This program and a computer-readable recording medium recording the program are within the present invention.

Specifically, the program is, for example, stored in a recording medium such as a CD-ROM, or supplied to the computer via various transmission media. As the recording medium recording the program, in addition to the CD-ROM, a flexible disk, a hard disk, a magnetic tape, a magneto-optical disk, or a nonvolatile memory card can be used. As the transmission medium of the program, a communication medium in a computer network (LAN, WAN of the Internet, or radio communication network) system for propagating program information as a carrier wave to supply the program can be used. As a communication medium in this case, a wire line such as an optical fiber or a wireless line is available.

The present invention is not limited to the mode of realizing the functions of the digital camera (image pickup apparatus) 100 of this embodiment by executing the supplied program via the computer. When the program cooperates with an operating system (OS) operating in the computer or other application software to realize the functions of the digital camera (image pickup apparatus) 100 of this embodiment, the program is within the present invention. When all processing operations of the supplied program or a part thereof is carried out by a function expansion board or a function expansion unit of the computer to realize the functions of the digital camera (image pickup apparatus) 100 of this embodiment, the program is within the present invention.

While the present invention has been described with reference to exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2008-074460, filed Mar. 21, 2008, which is hereby incorporated by reference herein in its entirety.

The invention claimed is:

1. An image pickup apparatus comprising:
   a flash unit which emits a flash to an object;
   a first converting unit which converts an optical image of the object formed by an optical unit into an electric signal used to obtain a visual image regarding photographing of the object;
   a second converting unit which converts optical images of the object, respectively passing through different pupils, into electric signals used to obtain distance measurement signals for measuring distance of the object, wherein the first converting unit and the second converting unit are disposed on a same image sensor;
   a distance measurement unit which generates a two-dimensional distance distribution in the visual image by measuring the distance using the distance measurement signals;
   a storing unit which stores light distribution characteristic data regarding light distribution characteristics of the flash unit; and
   a correction unit which corrects the visual image on the basis of distances included in the two-dimensional distance distribution generated by the distance measurement unit and the light distribution characteristic data corresponding to each distance included in the two-dimensional distance distribution.

2. An image pickup apparatus according to claim 1, wherein the second converting unit converts the optical image of the object pupil-divided by the optical unit into an electric signal to obtain the distance measurement signals.

3. An image pickup apparatus according to claim 1, wherein the first converting unit and the second converting unit each include an image pickup element having pixels two-dimensionally arranged on the same plane.

4. An image pickup apparatus according to claim 1, wherein the correction unit corrects the visual image by taking, as the light distribution characteristic data, a zoom position of the optical unit into consideration in addition to the distance of the object.

5. An image pickup apparatus according to claim 1, further comprising an iris for adjusting an amount of light incident to the optical unit,
   wherein the correction unit obtains a degree of in-focus with respect to each distance included in the two-dimensional distance distribution by using a zoom position and a focus position of the optical unit and an iris value of the iris, and corrects the visual image according to the degree of in-focus.

6. An image pickup apparatus according to claim 5, wherein the correction unit corrects only an image area of a degree of in-focus equal to or more than a predetermined threshold value among the degree of in-focus obtained for each image area.

7. An image pickup apparatus according to claim 1, wherein the correction unit corrects only an image area within the distance of the object equal to or less than a predetermined threshold value among the distances included in the two-dimensional distance distribution generated by the distance measurement unit.

8. An image pickup apparatus according to claim 1, further comprising an input unit which enters a photographing mode regarding photographing of the object,
wherein the correction unit determines whether to correct the visual image according to the photographing mode entered with the input unit.

9. An image pickup apparatus according to claim 8, wherein the input unit allows an operator to designate whether to correct the visual image for each photographing mode.

10. An image pickup apparatus according to claim 1, further comprising an input unit which enters a type of the optical unit,
wherein the correction unit determines whether to correct the visual image according to the type of the optical unit entered with the input unit.

11. An image pickup apparatus according to claim 10, wherein the input unit allows an operator to specify whether to correct the visual image for each type of the optical unit.

12. A control method for an image pickup apparatus including a flash unit which emits a flash to an object and a storing unit which stores light distribution characteristic data regarding light distribution characteristics of the flash unit, the control method comprising:
a first converting step of converting, using an image sensor, an optical image of the object formed by an optical unit, into an electric signal used to obtain a visual image regarding photographing of the object;
a second converting step of converting, using the image sensor, optical images of the object, respectively passing through different pupils, into electric signals used to obtain distance measurement signals for measuring distance of the object;
a distance measurement step of generating a two-dimensional distance distribution in the visual image by measuring the distance using the distance measurement signals; and
a correction step of correcting the visual image on the basis of distances included in the two-dimensional distance distribution generated in the distance measurement step and the light distribution characteristic data corresponding to each distance included in the two-dimensional distance distribution.

13. An image pickup apparatus according to claim 1, wherein the distance measurement unit generates the two-dimensional distance distribution in the visual image on a predetermined distance basis on the basis of the distance from the distance measurement signals.

14. A non-transitory computer-readable storage medium storing program code for causing a computer to execute the control method according to claim 12.

15. An image pickup apparatus comprising:
a flash unit which emits a flash to an object;
a first converting unit which converts an optical image of the object formed by an optical unit into an electric signal used to obtain a visual image regarding photographing of the object;
a second converting unit which converts the optical image of the object into an electric signal used to obtain distance measurement signals for measuring distance of the object, wherein the first converting unit and the second converting unit are disposed on a same image sensor;
a distance measurement unit which generates a two-dimensional distance distribution in the visual image by measuring the distance using the distance measurement signals;
a storing unit which stores light distribution characteristic data regarding light distribution characteristics of the flash unit;
a correction unit which corrects the visual image on the basis of distances included in the two-dimensional distance distribution generated by the distance measurement unit and the light distribution characteristic data corresponding to each distance included in the two-dimensional distance distribution; and
an input unit which enters a type of the optical unit,
wherein the correction unit determines whether to correct the visual image according to the type of the optical unit entered with the input unit.

16. An image pickup apparatus comprising:
a flash unit which emits a flash to an object;
an image pickup unit which converts optical images of the object formed by an optical unit into electric signals;
an obtaining unit which obtains a visual image regarding photographing of the object from the electric signals, wherein the image pickup unit and the obtaining unit are disposed on a same image sensor;
a distance measurement unit which generates a two-dimensional distance distribution in the visual image by measuring a distance of the object using the electric signals converted from optical images which respectively pass through different pupils;
a storing unit which stores light distribution characteristics data regarding light distribution characteristics of the flash unit; and
a correction unit which corrects the visual image on the basis of distances included in the two-dimensional distance distribution generated by the distance measurement unit and the light distribution characteristic data corresponding to each distance included in the two-dimensional distance distribution.

* * * * *